(12) United States Patent
Ju et al.

(10) Patent No.: US 10,200,603 B2
(45) Date of Patent: Feb. 5, 2019

(54) DATA PROCESSING SYSTEM FOR TRANSMITTING COMPRESSED MULTIMEDIA DATA OVER CAMERA INTERFACE

(71) Applicant: MEDIATEK INC., Hsin-Chu (TW)

(72) Inventors: Chi-Cheng Ju, Hsinchu (TW); Tsu-Ming Liu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/361,006

(22) Filed: Nov. 24, 2016

(65) Prior Publication Data

US 2017/0078567 A1    Mar. 16, 2017

Related U.S. Application Data

(63) Continuation of application No. 13/965,203, filed on Aug. 13, 2013, now Pat. No. 9,535,489.
(Continued)

(51) Int. Cl.
*H04N 5/232*    (2006.01)
*H04N 19/10*    (2014.01)
(Continued)

(52) U.S. Cl.
CPC ......... *H04N 5/23229* (2013.01); *G06F 1/325* (2013.01); *G06F 1/3278* (2013.01);
(Continued)

(58) Field of Classification Search
CPC ............. H04N 5/23229; H04N 19/184; H04N 19/146; H04N 19/10; H04N 19/179; H04N 19/12; H04N 19/154; H04N 5/23235; H04N 5/23293; H04N 5/23241; G06F 3/14; G06F 1/3278; G06F 1/325; G09G 2340/04; G09G 2340/02; Y02B 60/126

See application file for complete search history.

(56) References Cited

U.S. PATENT DOCUMENTS 5,502,485 A    3/1996 Suzuki
5,553,160 A    9/1996 Dawson
(Continued)

FOREIGN PATENT DOCUMENTS

CN    1206532 A    1/1999
CN    1504905 A    6/2004
(Continued)

*Primary Examiner* — Timothy J Henn
(74) *Attorney, Agent, or Firm* — Winston Hsu

(57) ABSTRACT

A data processing apparatus has a camera sensor, a camera buffer, a compressor, and an output interface. The camera sensor generates an input multimedia data. The camera buffer stores a first data derived from the input multimedia data. The compressor generates a compressed multimedia data by compressing a second data derived from the input multimedia data. The output interface packs the compressed multimedia data into a bitstream, and outputs the bitstream via a camera interface. The camera interface is coupled between the data processing apparatus and another data processing apparatus that are located at different chips, and the camera interface is a chip-to-chip interface that provides direct pin connections between the different chips.

4 Claims, 18 Drawing Sheets

Related U.S. Application Data

(60) Provisional application No. 61/729,426, filed on Nov. 23, 2012.

(51) Int. Cl.
| | | |
|---|---|---|
| *H04N 19/12* | (2014.01) | |
| *H04N 19/146* | (2014.01) | |
| *H04N 19/154* | (2014.01) | |
| *H04N 19/179* | (2014.01) | |
| *H04N 19/184* | (2014.01) | |
| *G06F 1/32* | (2006.01) | |
| *G06F 3/14* | (2006.01) | |

(52) U.S. Cl.
CPC ............ *G06F 3/14* (2013.01); *H04N 5/23235* (2013.01); *H04N 5/23241* (2013.01); *H04N 5/23293* (2013.01); *H04N 19/10* (2014.11); *H04N 19/12* (2014.11); *H04N 19/146* (2014.11); *H04N 19/154* (2014.11); *H04N 19/179* (2014.11); *H04N 19/184* (2014.11); *G09G 2340/02* (2013.01); *G09G 2340/04* (2013.01); *Y02D 10/157* (2018.01)

(56) References Cited

U.S. PATENT DOCUMENTS

| | | | |
|---|---|---|---|
| 5,778,191 A | 7/1998 | Levine | |
| 5,894,588 A | 4/1999 | Kawashima | |
| 6,031,929 A | 2/2000 | Maitz | |
| 6,201,834 B1 | 3/2001 | Zhu | |
| 6,507,672 B1 | 1/2003 | Watkins | |
| 6,614,934 B1* | 9/2003 | Wu | H04N 19/159 375/E7.139 |
| 6,704,310 B1 | 3/2004 | Zimmermann | |
| 6,914,637 B1* | 7/2005 | Wolf | H04L 1/0057 348/473 |
| 6,956,971 B1 | 10/2005 | Cho | |
| 7,110,025 B1 | 9/2006 | Loui | |
| 7,394,410 B1 | 7/2008 | Wegener | |
| 8,049,761 B1* | 11/2011 | Riach | G06F 13/4291 345/519 |
| 8,599,316 B2 | 12/2013 | Deever | |
| 9,036,714 B2* | 5/2015 | Tian | H04N 21/2365 375/240.25 |
| 9,077,917 B2 | 7/2015 | Frank | |
| 2002/0015092 A1 | 2/2002 | Feder | |
| 2002/0039139 A1 | 4/2002 | Hsu | |
| 2002/0186963 A1 | 12/2002 | Toyoda | |
| 2003/0165200 A1 | 9/2003 | Pugel | |
| 2003/0234799 A1 | 12/2003 | Lee | |
| 2004/0008772 A1 | 1/2004 | Kojima | |
| 2004/0008788 A1* | 1/2004 | Kono | H04N 19/172 375/240.25 |
| 2004/0012686 A1 | 1/2004 | Ono | |
| 2004/0218816 A1 | 11/2004 | Hannuksela | |
| 2005/0027893 A1 | 2/2005 | Jung | |
| 2005/0073586 A1* | 4/2005 | Li | H04N 7/01 348/207.1 |
| 2005/0195205 A1 | 9/2005 | Abrams, Jr. | |
| 2005/0207453 A1 | 9/2005 | Panvalkar | |
| 2005/0259748 A1* | 11/2005 | Payson | G06F 3/14 375/240.25 |
| 2005/0276496 A1 | 12/2005 | Molgaard | |
| 2006/0104356 A1* | 5/2006 | Crinon | H04N 21/23406 375/240.12 |
| 2006/0176954 A1* | 8/2006 | Lu | H04N 19/42 375/240.03 |
| 2006/0176960 A1* | 8/2006 | Lu | H04N 19/61 375/240.23 |
| 2006/0222252 A1 | 10/2006 | Lee | |
| 2007/0046683 A1 | 3/2007 | Iga | |
| 2007/0206871 A1 | 9/2007 | Jalil | |
| 2008/0025412 A1 | 1/2008 | Lee | |
| 2008/0076471 A1 | 3/2008 | Yuki | |
| 2008/0170806 A1 | 7/2008 | Kim | |
| 2008/0317117 A1 | 12/2008 | Le Floch | |
| 2009/0010440 A1* | 1/2009 | Jung | G10L 19/008 381/1 |
| 2009/0086174 A1 | 4/2009 | Fukumoto | |
| 2009/0129219 A1 | 5/2009 | Marumori | |
| 2009/0244303 A1 | 10/2009 | Kinoshita | |
| 2010/0073574 A1 | 3/2010 | Nakajima | |
| 2010/0149304 A1 | 6/2010 | Chao | |
| 2010/0172599 A1 | 7/2010 | Choi | |
| 2010/0260486 A1 | 10/2010 | Liu | |
| 2010/0309975 A1 | 12/2010 | Zhou | |
| 2010/0309987 A1 | 12/2010 | Concion | |
| 2011/0007128 A1* | 1/2011 | Chen | H04L 12/1822 348/14.08 |
| 2011/0018970 A1 | 1/2011 | Wakabayashi | |
| 2011/0075729 A1 | 3/2011 | Dane | |
| 2011/0206289 A1* | 8/2011 | Dikbas | H04N 19/00484 382/238 |
| 2011/0228858 A1* | 9/2011 | Budagavi | H04N 19/70 375/240.25 |
| 2011/0234902 A1* | 9/2011 | Shenoi | H04J 3/0632 348/515 |
| 2011/0249723 A1 | 10/2011 | Wasily | |
| 2011/0261217 A1 | 10/2011 | Muukki | |
| 2011/0273589 A1 | 11/2011 | Mochimizo | |
| 2012/0120287 A1 | 5/2012 | Funamoto | |
| 2012/0133800 A1 | 5/2012 | Jung | |
| 2012/0314097 A1 | 12/2012 | Hayashi | |
| 2013/0011047 A1 | 1/2013 | Kwon | |
| 2013/0322517 A1 | 12/2013 | Zurpal | |
| 2014/0092439 A1 | 4/2014 | Krig | |
| 2014/0098111 A1 | 4/2014 | Ju | |
| 2014/0098119 A1 | 4/2014 | Ju | |
| 2014/0098893 A1 | 4/2014 | Ju | |
| 2014/0105514 A1 | 4/2014 | Wu | |
| 2014/0146194 A1* | 5/2014 | Ju | H04N 5/23229 348/222.1 |
| 2015/0103898 A1* | 4/2015 | Ye | H04N 19/70 375/240.12 |

FOREIGN PATENT DOCUMENTS

| | | |
|---|---|---|
| CN | 1630371 A | 6/2005 |
| CN | 2724334 Y | 9/2005 |
| CN | 101002477 A | 7/2007 |
| CN | 101090495 A | 12/2007 |
| CN | 101217623 A | 7/2008 |
| CN | 201127091 Y | 10/2008 |
| CN | 101534448 A | 9/2009 |
| CN | 101702778 A | 5/2010 |
| CN | 101778161 A | 7/2010 |
| CN | 101904751 A | 12/2010 |
| CN | 102118791 A | 7/2011 |
| CN | 102118792 A | 7/2011 |
| CN | 102547151 A | 7/2012 |
| CN | 202353700 U | 7/2012 |
| CN | 102647611 A | 8/2012 |
| CN | 102685532 A | 9/2012 |
| CN | 202551178 U | 11/2012 |
| CN | 102843566 A | 12/2012 |
| CN | 103220492 A | 7/2013 |
| CN | 103294038 A | 9/2013 |
| CN | 103338354 A | 10/2013 |
| EP | 2068228 A2 | 6/2009 |
| TW | 200830170 A | 7/2008 |
| WO | 2012076906 A1 | 6/2012 |

\* cited by examiner

DATA PROCESSING SYSTEM FOR TRANSMITTING COMPRESSED MULTIMEDIA DATA OVER CAMERA INTERFACE

CROSS REFERENCE TO RELATED APPLICATION

This is a continuation of U.S. non-provisional application Ser. No. 13/965,203 filed Aug. 13, 2013, which claims the benefit of U.S. provisional application No. 61/729,426 filed Nov. 23, 2012. The entire contents of U.S. non-provisional application Ser. No. 13/965,203 and U.S. provisional application No. 61/729,426 are incorporated herein by reference.

BACKGROUND

The disclosed embodiments of the present invention relate to transmitting multimedia data over a camera interface, and more particularly, to a data processing system which transmits compressed multimedia data over a camera interface.

A camera interface is disposed between a first chip and a second chip to transmit multimedia data from the first chip to the second chip for further processing. For example, the first chip may include a camera module, and the second chip may include an image signal processor (ISP). The multimedia data may include image data (i.e., a single captured image) or video data (i.e., a video sequence composed of a plurality of captured images). In handheld systems, the camera transmission protocol may be standardized so as to enable interoperability. Capturing and transmitting the multimedia data directly to the image signal processor via the pre-defined protocol is inefficient due to the limited transmission bandwidth and large data amount. For example, an 8-M sensor (i.e., a sensor having 8-Mega pixels, that is, 3264×2448 pixels) with 30 fps (frames per second) and 10-bit pixel depth requires around 2.4G bps over one data lane transmission. This high data transmission rate impacts power consumption and electromagnetic interference (EMI) of the transmission interface as well as the design yield in the mass production stage. Moreover, the demands of high-resolution cameras such as 20M cameras are increasing. Hence, the multimedia data directly transmitted over the transmission interface between the camera module and the ISP would have a larger data size/data rate, which increases the power consumption of the camera interface inevitably. If the camera module and the ISP are both located at a handheld device (e.g., a smartphone) powered by a battery device, the battery life is shortened due to the increased power consumption of the transmission interface. Thus, there is a need for an innovative design which can effectively reduce the power consumption of the transmission interface between the camera module and the ISP.

SUMMARY

In accordance with exemplary embodiments of the present invention, a data processing system which transmits compressed multimedia data over a camera interface is proposed to solve the above-mentioned problem.

According to a first aspect of the present invention, an exemplary data processing apparatus is disclosed. The exemplary data processing apparatus includes a camera sensor, a camera buffer, a compressor, and an output interface. The camera sensor is arranged to generate an input multimedia data. The camera buffer is arranged to store a first data derived from the input multimedia data. The compressor is arranged to generate a compressed multimedia data by compressing a second data derived from the input multimedia data. The output interface is arranged to pack the compressed multimedia data into a bitstream, and output the bitstream via a camera interface. The camera interface is coupled between the data processing apparatus and another data processing apparatus that are located at different chips, and the camera interface is a chip-to-chip interface that provides direct pin connections between the different chips.

According to a second aspect of the present invention, an exemplary data processing apparatus is disclosed. The exemplary data processing apparatus includes an input interface, a data access circuit, and a de-compressor. The input interface is arranged to receive a bitstream from a camera interface, and un-pack the bitstream into an input multimedia data, wherein the input multimedia data comprises a compressed multimedia data. The data access circuit is arranged to store a first data derived from the input multimedia data into a multimedia buffer and read a buffered data from the multimedia buffer. The de-compressor is arranged to generate a de-compressed multimedia data by de-compressing a second data derived from the input multimedia data. The camera interface is coupled between the data processing apparatus and another data processing apparatus that are located at different chips, and the camera interface is a chip-to-chip interface that provides direct pin connections between the different chips.

According to a third aspect of the present invention, an exemplary method performed by a data processing apparatus is disclosed. The exemplary method includes: generating an input multimedia data by a camera sensor; storing a first data derived from the input multimedia data into a camera buffer; compressing a second data derived from the input multimedia data to generate a compressed multimedia data; and packing the compressed multimedia data into a bitstream, and outputting the bitstream via a camera interface. The camera interface is coupled between the data processing apparatus and another data processing apparatus that are located at different chips, and the camera interface is a chip-to-chip interface that provides direct pin connections between the different chips.

According to a fourth aspect of the present invention, an exemplary method performed by a data processing apparatus is disclosed. The exemplary method includes: receiving a bitstream from a camera interface, and un-packing the bitstream into an input multimedia data, wherein the input multimedia data comprises a compressed multimedia data; storing a first data derived from the input multimedia data into a multimedia buffer, and reading a buffered data from the multimedia buffer; and de-compressing a second data derived from the input multimedia data to generate a de-compressed multimedia data. The camera interface is coupled between the data processing apparatus and another data processing apparatus that are located at different chips, and the camera interface is a chip-to-chip interface that provides direct pin connections between the different chips.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The concept of the present invention is to apply data compression upon multimedia data and then transmit compressed multimedia data over a transmission interface (i.e., a camera interface) between a camera module and an image signal processor. As the data size/data rate of the compressed multimedia data is smaller than that of the original un-compressed multimedia data, the power consumption of the camera interface is reduced correspondingly. Further details will be described as below.

Figure 1:
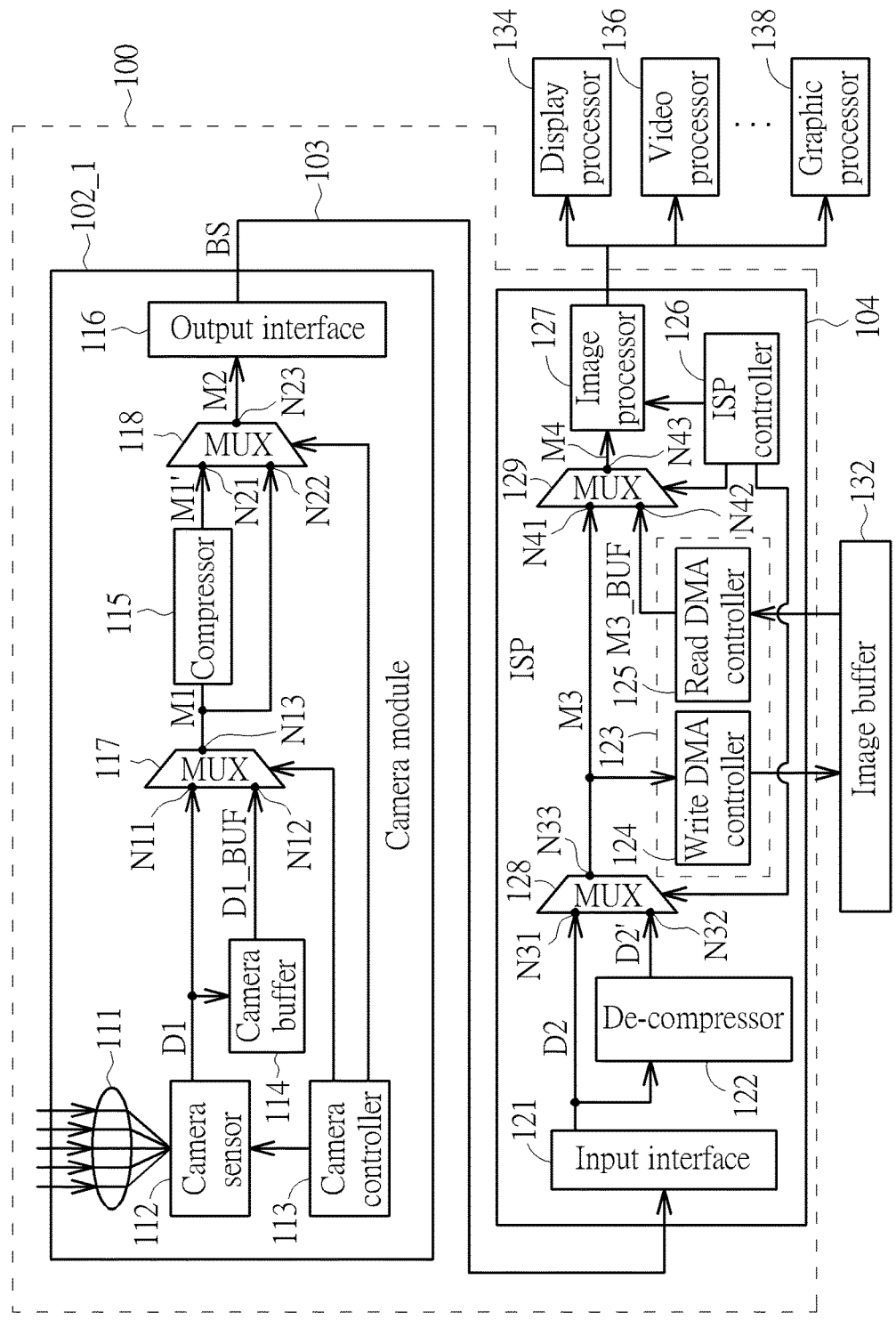
FIG. 1 is a block diagram illustrating a data processing system according to a first embodiment of the present invention.

FIG. 1 is a block diagram illustrating a data processing system according to a first embodiment of the present invention. The data processing system 100 includes a plurality of data processing apparatuses such as a camera module 102_1 and an image signal processor (ISP) 104. The camera module 102_1 and the ISP 104 may be different chips, and the camera module 102_1 communicates with the ISP 104 via a camera interface 103. By way of example, but not limitation, the camera interface 103 may be a camera serial interface (CSI) standardized by a Mobile Industry Processor Interface (MIPI).

The camera module 102_1 includes, but not limited to, a lens module 111, a camera sensor 112, a camera controller 113, a camera buffer 114, a compressor 115, an output interface 116, and a plurality of multiplexers (MUXs) 117, 118. The camera controller 113 is arranged for controlling operations of the camera module 102_1. For example, the camera controller 113 controls the camera sensor 112 and the multiplexers 117, 118. The lens module 111 guides the incident light to the camera sensor 112. The camera sensor 112 receives the light passing through the lens module 111, and then generates an input multimedia data D1 correspondingly, wherein the input multimedia data D1 may be a single captured image or a video sequence composed of a plurality of captured images. By way of example, the camera sensor 112 may be an analog video camera tube, digital charge-coupled device (CCD), or complementary metal-oxide semi-conductor (CMOS) image sensor. The input multimedia data D1 may be a single captured image or a video sequence composed of a plurality of captured images. Further, the input multimedia data D1 may be single view data for 2D display or multiple view data for 3D display. The multiplexer 117 has a plurality of input ports N11, N12 and an output port N13. The input port N11 is arranged to receive the input multimedia data D1 from the camera sensor 112. In this embodiment, the input multimedia data D1 may be stored into the camera buffer 114 for future use. Hence, the input multimedia data D1 stored in the camera buffer 114 (i.e., a buffered multimedia data D1_BUF) is supplied to the input port N12. The camera controller 113 controls the multiplexer 117 to couple the output port N13 to one of the input ports N11, N12 such that one of the input multimedia data D1 and the buffered multimedia data D1_BUF is selected as a multiplexer output M1.

The camera module 102_1 may operate in a normal mode (i.e., a non-compression mode) or a compression mode. As shown in FIG. 1, the multiplexer 118 has a plurality of input ports N21, N22 and an output port N23. The input port N22 is arranged for receiving the multiplexer output M1 generated from the multiplexer 117. The input port N21 is arranged for receiving a compressed multimedia data M1' generated from the compressor 115 by applying data compression to the multiplexer output M1. The output port N23 is arranged for selectively outputting the multiplexer output M1 or the compressed multimedia data M1' to the output interface 116. When the camera controller 113 controls the camera module 102_1 to operate under the normal/non-compression mode, the compressor 115 is disabled or powered off, and the multiplexer 118 selects the multiplexer output M1 as a multiplexer output M2. When the camera controller 113 controls the camera module 102_1 to operate under the compression mode, the compressor 115 is enabled or powered on to receive the multiplexer output M1 and generate the compressed multimedia data M1' according to the received multiplexer output M1; besides, the multiplexer 118 selects the compressed multimedia data M1' as its multiplexer output M2. It should be noted that the compressor 115 may employ a lossy or lossless compression algorithm, depending upon actual design consideration/requirement.

The output interface 116 is coupled to the multiplexer 118, and arranged for packing the multiplexer output M2 into a bitstream BS and outputting the bitstream BS to the camera interface 103. More specifically, the output interface 116 packetizes the multiplexer output M2 based on the transmission protocol of the camera interface 103. As mentioned above, the multiplexer output M2 may be the multiplexer output M1 (which is either the input multiplexer data D1 or the buffered multimedia data D1_BUF) or the compressed multimedia data M1'. Therefore, when the camera module 102_1 operates under the normal/non-compression mode, the output interface 116 is operative to convert the multiplexer output M1 into the bitstream BS; and when the camera module 102_1 operates under the compression mode, the output interface 116 is operative to convert the compressed multimedia data M1' into the bitstream BS.

The ISP 104 includes, but not limited to, an input interface 121, a de-compressor 122, a data access circuit 123 having a write direct memory access (DMA) controller 124 and a read DMA controller 125 included therein, an ISP controller 126, an image processor 127, and a plurality of multiplexers 128, 129. The ISP controller 126 is arranged to control operations of the ISP 104. For example, the ISP controller 126 controls the image processor 127 and the multiplexers 128, 129. Hence, the ISP controller 126 determines all of the operations in ISP 104, including resizing, rotation, quality enhancement, read/write access behavior adjustment, and the data path switching.

The ISP 104 may operate in a normal mode (i.e., a non-decompression mode) or a de-compression mode. That is, when the camera module 102_1 operates under the normal/non-compression mode, the ISP controller 126 controls the ISP 104 to operate under the normal/non-decompression mode; and when the camera module 102_1 operates under the compression mode, the ISP controller 126 controls the ISP 104 to operate under the de-compression mode. In this way, the multimedia data can be correctly received at the ISP 104.

The input interface 121 is arranged for receiving the bitstream BS via the camera interface 103, and un-packing the bitstream BS into an input multimedia data D2. More specifically, the input interface 121 un-packetizes the bitstream BS based on the transmission protocol of the camera interface 103. As shown in FIG. 1, the multiplexer 128 has a plurality of input ports N31, N32 and an output port N33. The input port N32 is arranged for receiving a de-compressed multimedia data D2' generated from the de-compressor 122. The input port N31 is arranged for receiving the input multimedia data D2 generated from the input interface 121. The output port N33 is arranged for selectively outputting the input multimedia data D2 or the de-compressed multimedia data D2'. When the ISP 104 operates under the normal/non-decompression mode, the input multimedia data D2 is identical to the input multimedia data D1 if no error occurs during the transmission. In addition, the de-compressor 122 is disabled or powered off, and the multiplexer 128 selects the input multimedia data D2 as a multiplexer output M3. When the ISP 104 operates under the de-compression mode, the input multimedia data D2 is identical to the compressed multimedia data M1' if no error occurs during the transmission, and the de-compressed multimedia data D2' is identical to the input multimedia data D1 if lossless compression is applied and no error occurs during data de-compression. In addition, the de-compressor 122 is enabled or powered on to receive the input multimedia data D2 and generate the de-compressed multimedia data D2' according to the received input multimedia data D2, and the multiplexer 128 selects the de-compressed multimedia data D2' as the multiplexer output M3.

In this embodiment, the ISP 104 supports two internal transmission modes, including an on-the-fly mode and an off-line mode, for sending the multimedia data to the image processor 127. The on-the-fly mode of the ISP 104 means that the multimedia data is directly sent to the image processor 127 without picture size wise buffering on the transmission path. The off-line mode of the ISP 104 means that the multimedia data is stored into an image buffer (e.g., a static random access memory (SRAM), a dynamic random access memory (DRAM), or a register file) 132 via the write DMA controller 124 and then the buffered multimedia data is read from the image buffer 132 via the read DMA controller 125. Hence, when the off-line mode is selected by the ISP 104, the image buffer 132 buffers the multiplexer output M3 and outputs a buffered multimedia data M3_BUF; and when the on-the-fly mode is selected by the ISP 104, the ISP controller 126 may block the multiplexer output M3 from entering the image buffer 132 or block the buffered multimedia data M3_BUF from being selected as an output of the multiplexer 129. As shown in FIG. 1, the multiplexer 129 has a plurality of input ports N41, N42 and an output port N43. The input port N41 is arranged for receiving the multiplexer output M3 generated from the multiplexer 128. The input port N42 is arranged for receiving the buffered multimedia data M3_BUF read from the image buffer 132. The output port N43 is arranged for selectively outputting the multiplexer output M3 or the buffered multimedia data M3_BUF as a multiplexer output M4 to the following image processor 127. The processed multimedia data generated by the image processor 127 may be sent to one or multiple processors, such as a display processor 134, a video processor 136 and/or a graphic processor 138, for further processing.

Briefly summarized, the compressor 115 is located between the camera sensor 112 and the output interface 116, and the de-compressor 122 is located right behind the input interface 121. Hence, the compressor 115 is active only when the compression mode is enabled. Regarding the de-compressor 122, it is active in both on-the-fly mode and off-line mode when the compressor 115 is active to generate the compressed multimedia data M1' to be transmitted over the camera interface 103. The multiplexer 118 configures its internal interconnection based on whether or not the compression mode is enabled. The multiplexer 128 configures its internal interconnection based on whether or not the de-compression mode is enabled. The multiplexer 129 configures its internal interconnection based on a selected internal transmission mode, either the on-the-fly mode or the off-line mode. When the compression mode is enabled, the transmission data rate between the camera module 102_1 and the ISP 104 is reduced, thus lowering the power consumption of the camera interface 103.

Figure 2:
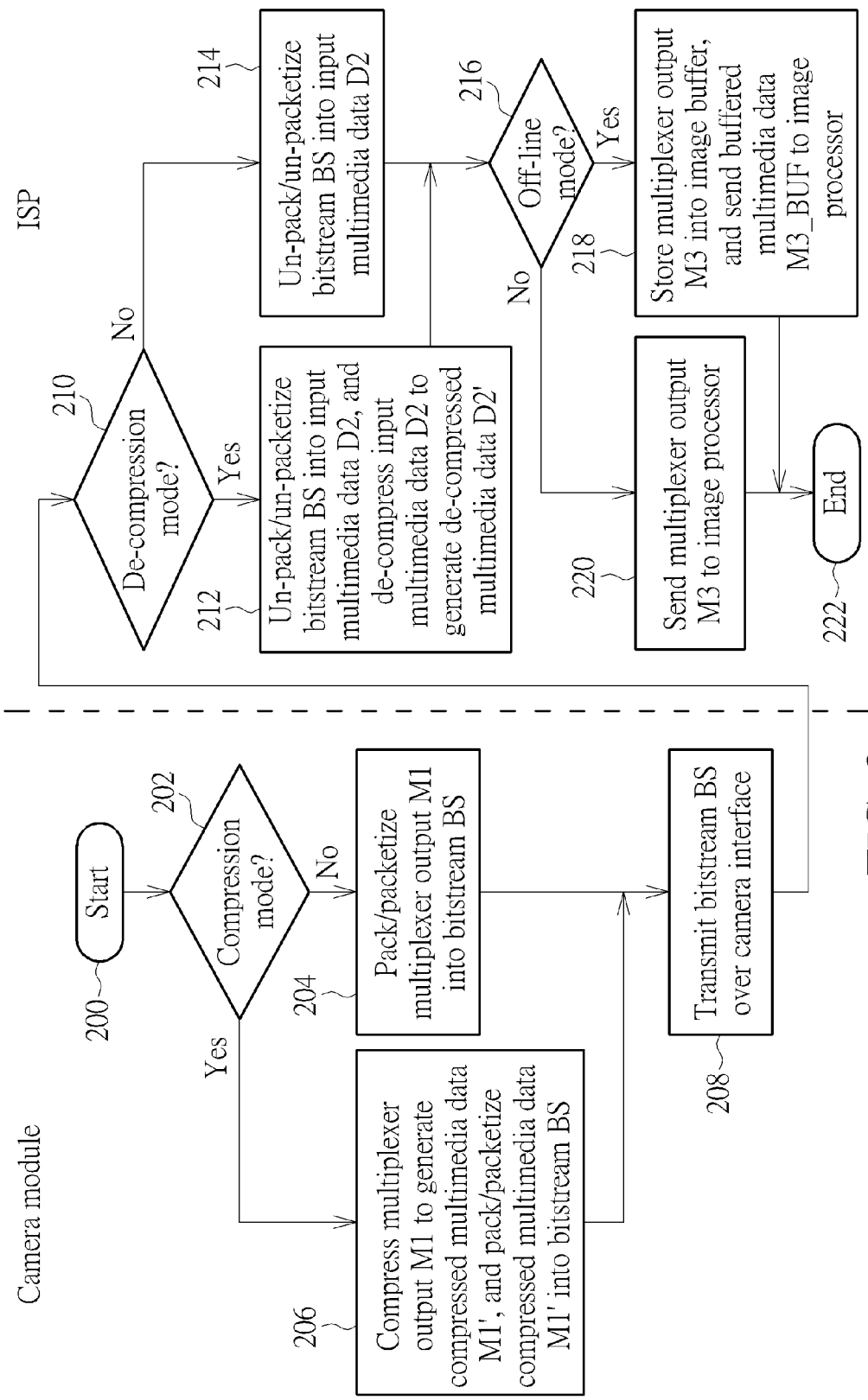
FIG. 2 is a flowchart illustrating a control and data flow of the data processing system shown in FIG. 1.

FIG. 2 is a flowchart illustrating a control and data flow of the data processing system 100 shown in FIG. 1. Provided that the result is substantially the same, the steps are not required to be executed in the exact order shown in FIG. 2. The exemplary control and data flow may be briefly summarized by following steps.

Step 200: Start.
Step 202: Check if a compression mode is enabled. If yes, go to step 206; otherwise, go to step 204.
Step 204: Pack/packetize the multiplexer output M1 (M2=M1) into the bitstream BS. Go to step 208.
Step 206: Compress the multiplexer output M1 to generate the compressed multimedia data M1', and pack/packetize the compressed multimedia data M1' (M2=M1') into the bitstream BS.
Step 208: Transmit the bitstream BS over the camera interface 103.
Step 210: Check if a de-compression mode is enabled. If yes, go to step 212; otherwise, go to step 214.
Step 212: Un-pack/un-packetize the bitstream BS into the input multimedia data D2, and de-compress the input multimedia data D2 to generate the de-compressed multimedia data D2'. Go to step 216.
Step 214: Un-pack/un-packetize the bitstream BS into the input multimedia data D2.
Step 216: Check if the off-line mode is selected for sending the multimedia data to the image processor 127. If yes, go to step 218; otherwise, go to step 220.
Step 218: Store the multiplexer output M3 into the image buffer 132, and send the buffered multimedia data M3_BUF to the image processor 127. Go to step 222.
Step 220: Send the multiplexer output M3 to the image processor 127.
Step 222: End.

It should be noted that steps 202-208 are performed by the camera module 102_1, and steps 210-220 are performed by the ISP 104. As a person skilled in the art can readily understand details of each step shown in FIG. 2 after reading above paragraphs directed to the data processing system 100 shown in FIG. 1, further description is omitted here for brevity.

In the embodiment shown in FIG. 1, the compressor 115 is located between the camera sensor 112/camera buffer 114 and the output interface 116. However, this is for illustrative purposes only, and is not meant to be a limitation of the present invention. Several alternative designs of the camera module are given as below.

Figure 3:
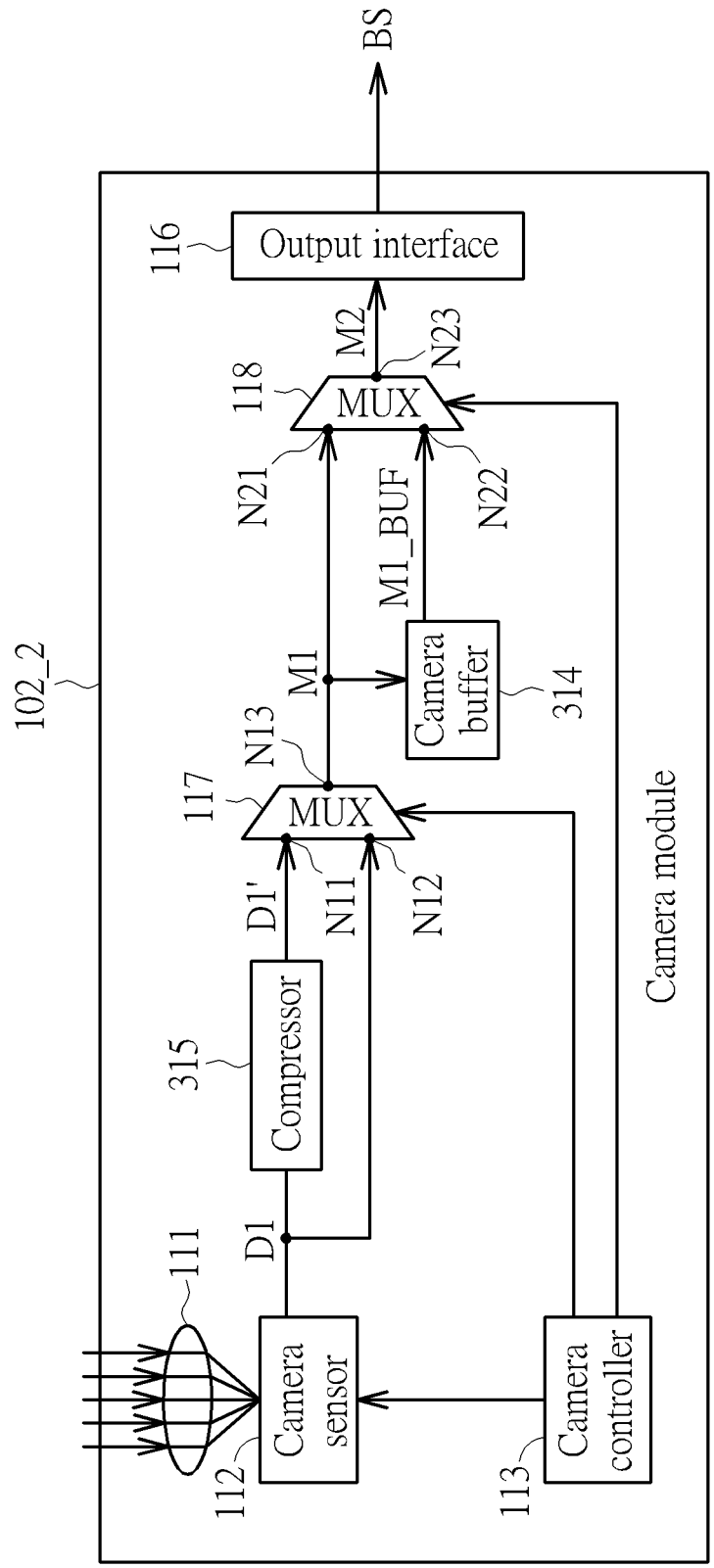
FIG. 3 is a block diagram illustrating a first alternative design of the camera module according to an embodiment of the present invention.

Please refer to FIG. 3, which is a block diagram illustrating a first alternative design of the camera module according to an embodiment of the present invention. The camera module 102_1 shown in FIG. 1 may be replaced by the camera module 102_2. As shown in FIG. 3, the camera module 102_2 includes a camera buffer 314, a compressor 315 and the aforementioned lens module 111, camera sensor 112, camera controller 113, output interface 116 and multiplexers 117, 118. In this embodiment, the compressor 315 is located between the camera sensor 112 and the camera buffer 314/output interface 116. Hence, the input port N11 of the multiplexer 117 is arranged to receive the compressed multimedia data D1' generated from the compressor 315 applying data compression to the input multimedia data D1. The input port N12 of the multiplexer 117 receives the input multimedia data D1 generated from the camera sensor 112. The multiplexer 117 is controlled by the camera controller 113 to select one of the input multimedia data D1 and the compressed multimedia data D1' to act as its multiplexer output M1. The input port N21 of the multiplexer 118 is arranged to receive the multiplexer output M1 from the output port N13 of the multiplexer 117. The multiplexer output M1 is stored into the camera buffer 314. The input port N22 of the multiplexer 118 is arranged to receive the buffered multimedia data M1_BUF (i.e., the multiplexer output M1 stored in the camera buffer 314). The multiplexer 118 is controlled by the camera controller 113 to select one of the multiplexer output M1 and the buffered multimedia data M1_BUF to act as its multiplexer output M2.

Figure 4:
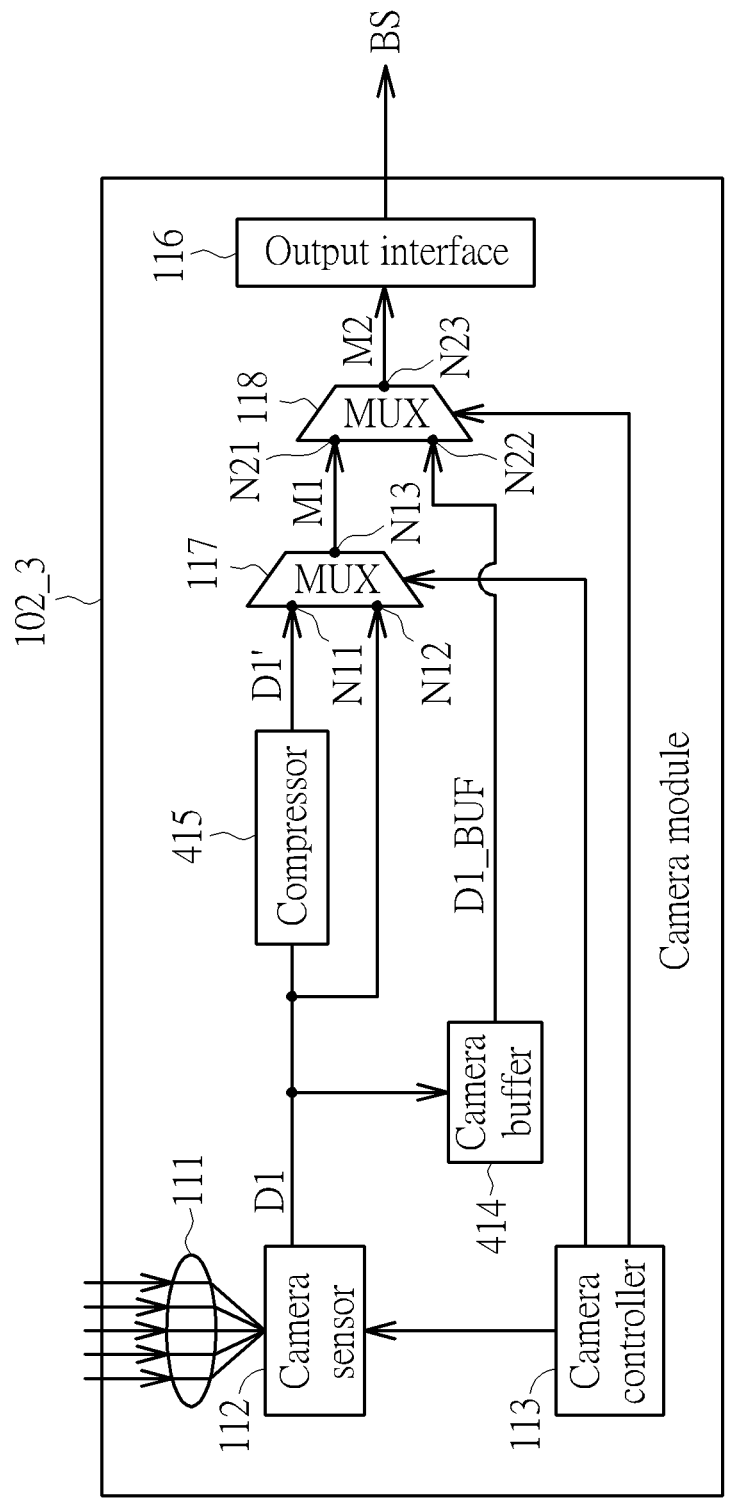
FIG. 4 is a block diagram illustrating a second alternative design of the camera module according to an embodiment of the present invention.

Please refer to FIG. 4, which is a block diagram illustrating a second alternative design of the camera module according to an embodiment of the present invention. The camera module 102_1 shown in FIG. 1 may be replaced by the camera module 102_3. The camera module 102_3 includes a camera buffer 414, a compressor 415 and the aforementioned lens module 111, camera sensor 112, camera controller 113, output interface 116 and multiplexers 117, 118. In this embodiment, the compressor 415 is located between the camera sensor 112 and the output interface 116, and the compressor 415 and the camera buffer 314 are connected in a parallel manner. Hence, the input port N11 of the multiplexer 117 is arranged to receive the compressed multimedia data D1' generated from the compressor 415 applying data compression to the input multimedia data D1. The input port N12 of the multiplexer 117 receives the input multimedia data D1 generated from the camera sensor 112. The multiplexer 117 is controlled by the camera controller 113 to select one of the input multimedia data D1 and the compressed multimedia data D1' to act as its multiplexer output M1. The input port N21 of the multiplexer 118 is arranged to receive the multiplexer output M1 from the output port N13 of the multiplexer 117. The input multimedia data D1 is stored into the camera buffer 414. The input port N22 of the multiplexer 118 is arranged to receive the buffered multimedia data D1_BUF (i.e., the input multimedia data D1 stored in the camera buffer 414). The multiplexer 118 is controlled by the camera controller 113 to select one of the multiplexer output M1 and the buffered multimedia data D1_BUF to act as its multiplexer output M2.

Figure 5:
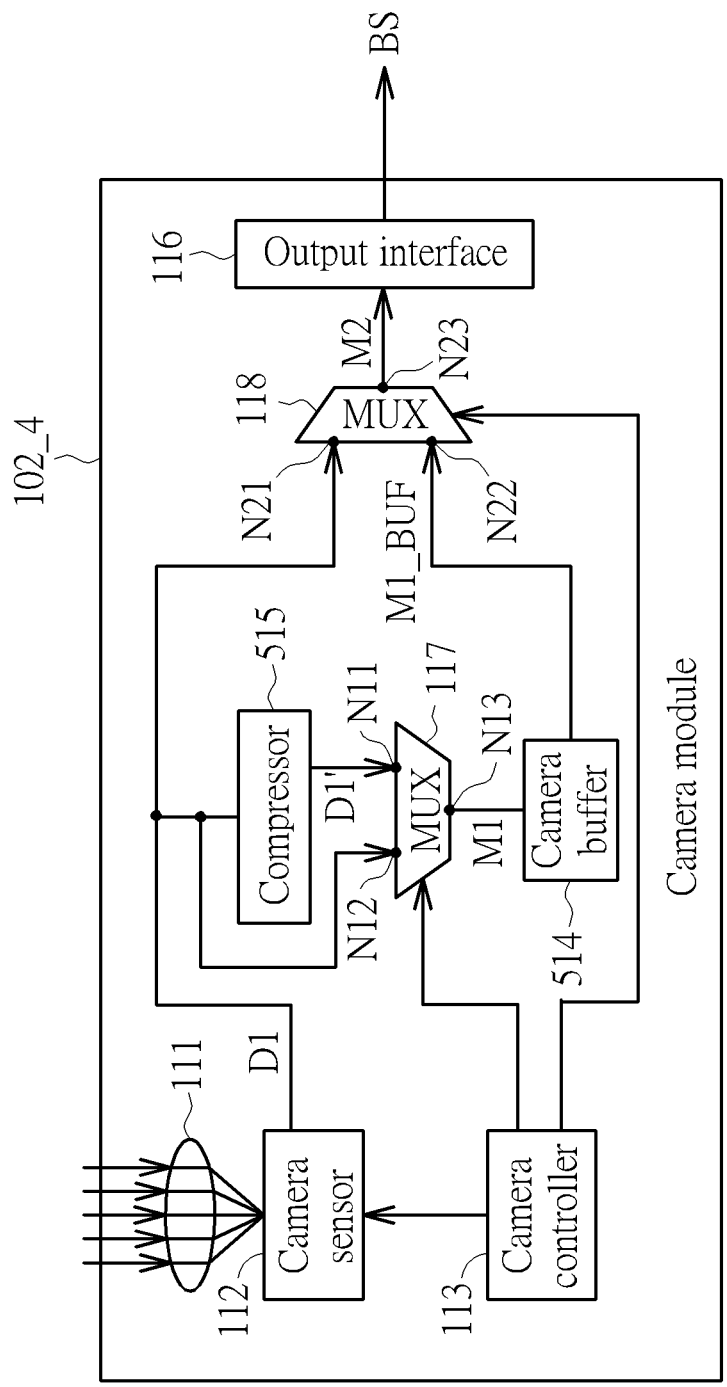
FIG. 5 is a block diagram illustrating a third alternative design of the camera module according to an embodiment of the present invention.

Please refer to FIG. 5, which is a block diagram illustrating a third alternative design of the camera module according to an embodiment of the present invention. The camera module 102_1 shown in FIG. 1 may be replaced by the camera module 102_4. The camera module 102_4 includes a camera buffer 514, a compressor 515 and the aforementioned lens module 111, camera sensor 112, camera controller 113, output interface 116 and multiplexers 117, 118. In this embodiment, the compressor 515 is located between the camera sensor 112 and the camera buffer 314. Hence, the input port N11 of the multiplexer 117 is arranged to receive the compressed multimedia data D1' generated from the compressor 515 applying data compression to the input multimedia data D1. The input port N12 of the multiplexer 117 receives the input multimedia data D1 generated from the camera sensor 112. The multiplexer 117 is controlled by the camera controller 113 to select one of the input multimedia data D1 and the compressed multimedia data D1' to act as its multiplexer output M1. The input port N21 of the multiplexer 118 is arranged to receive the input multimedia data D1. The multiplexer output M1 is stored into the camera buffer 514. The input port N22 of the multiplexer 118 is arranged to receive the buffered multimedia data M1_BUF (i.e., the multiplexer output M1 stored in the camera buffer 514). The multiplexer 118 is controlled by the camera controller 113 to select one of the input multimedia data D1 and the buffered multimedia data M1_BUF to act as its multiplexer output M2.

Figure 6:
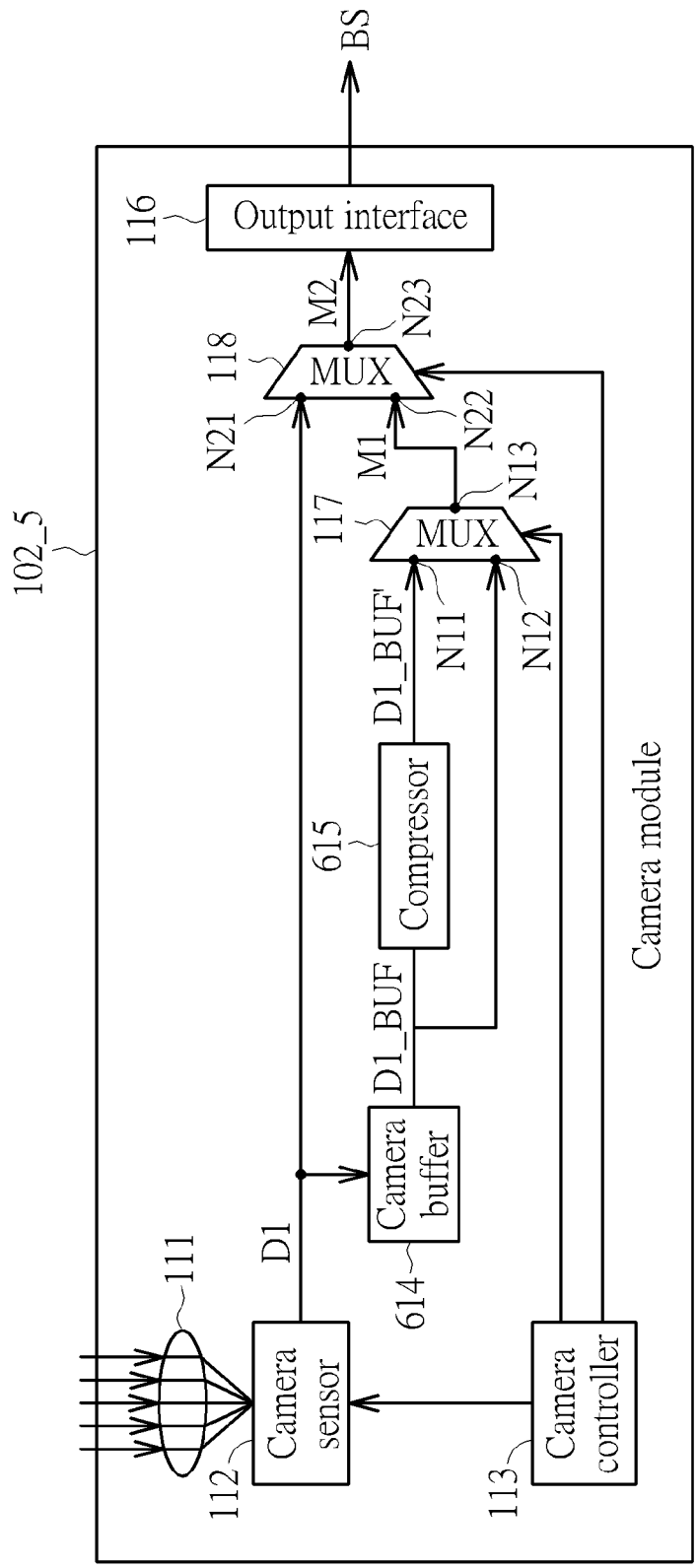
FIG. 6 is a block diagram illustrating a fourth alternative design of the camera module according to an embodiment of the present invention.

Please refer to FIG. 6, which is a block diagram illustrating a fourth alternative design of the camera module according to an embodiment of the present invention. The camera module 102_1 shown in FIG. 1 may be replaced by the camera module 102_5. The camera module 102_5 includes a camera buffer 614, a compressor 615 and the aforementioned lens module 111, camera sensor 112, camera controller 113, output interface 116 and multiplexers 117, 118. In this embodiment, the compressor 615 is located between the camera buffer 614 and the output interface 116, and the compressor 615 and the camera sensor 112 are connected in a parallel manner. Hence, the input multimedia data D1 is stored into the camera buffer 614. The input port N11 of the multiplexer 117 is arranged to receive the compressed multimedia data D1_BUF' generated from the compressor 615 applying data compression to the buffered multimedia data D1_BUF (i.e., the input multimedia data D1 stored in the camera buffer 614). The input port N12 of the multiplexer 117 receives the buffered multimedia data D1_BUF from the camera buffer 614. The multiplexer 117 is controlled by the camera controller 113 to select one of the compressed multimedia data D1_BUF' and the buffered multimedia data D1_BUF to act as its multiplexer output M1. The input port N21 of the multiplexer 118 is arranged to receive the input multimedia data D1. The input port N22 of the multiplexer 118 is arranged to receive the multiplexer output M1. The multiplexer 118 is controlled by the camera controller 113 to select one of the input multimedia data D1 and the multiplexer output M1 to act as its multiplexer output M2.

Regarding the data processing system 100 shown in FIG. 1, when data compression is applied to the multimedia data to be transmitted over the camera interface 103, the de-compressed multimedia data D2' is sent to the image processor 127 no matter whether the selected internal transmission mode is the on-the-fly mode or the off-line mode. However, this is for illustrative purposes only, and is not meant to be a limitation of the present invention. That is, the de-compressor is allowed to be located at a different path within the ISP. Several alternative designs of the ISP are given as below.

Figure 7:
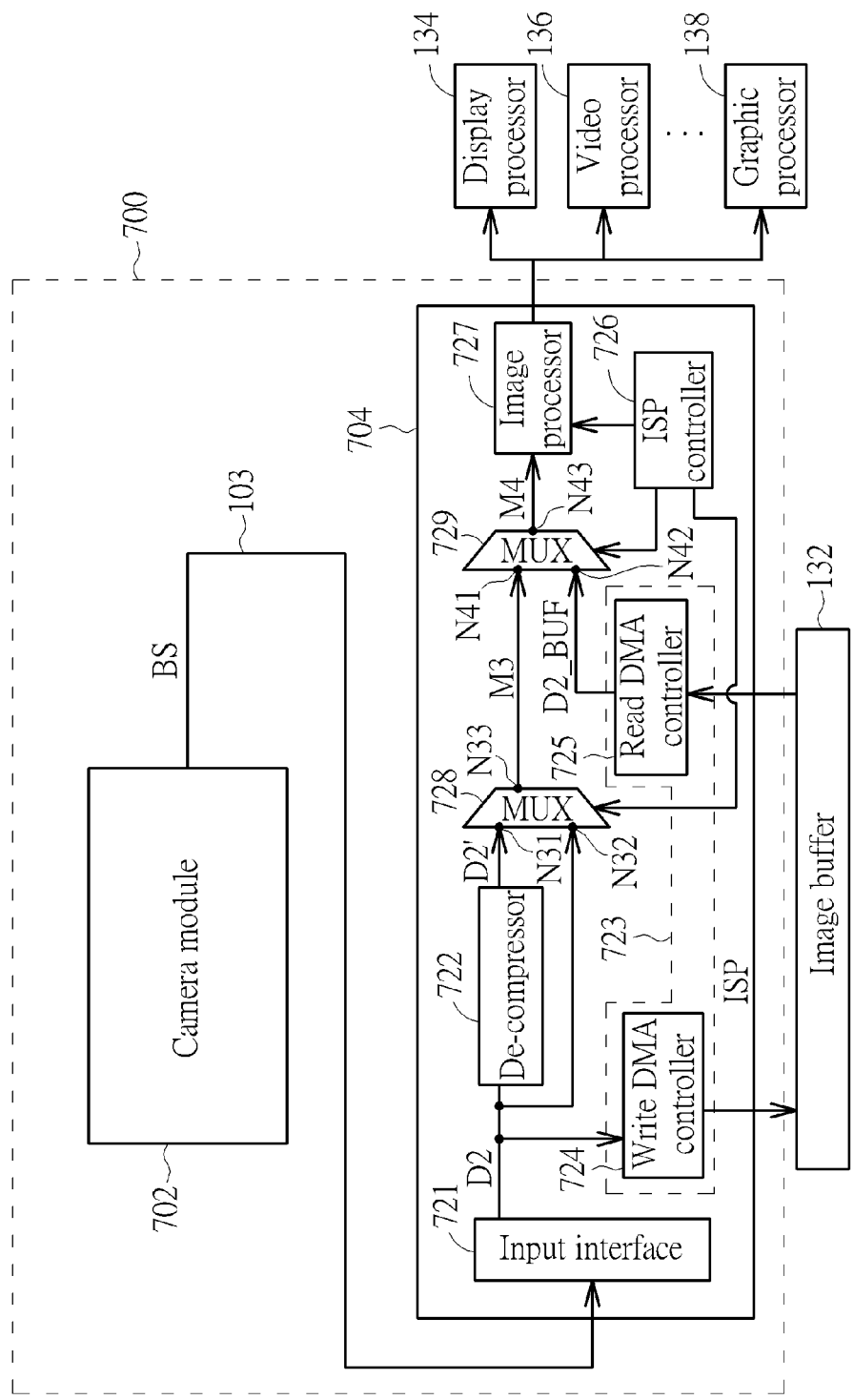
FIG. 7 is a block diagram illustrating a data processing system according to a second embodiment of the present invention.

Please refer to FIG. 7, which is a block diagram illustrating a data processing system according to a second embodiment of the present invention. The data processing system 700 includes a plurality of data processing apparatuses such as a camera module 702 and an ISP 704. The camera module 702 may be implemented using one of the aforementioned camera modules 102_1, 102_2, 102_3, 102_4, 102_5. The camera module 702 and the ISP 704 may be different chips, and the camera module 702 communicates with the ISP 704 via the aforementioned camera interface 103. In this embodiment, the ISP 704 includes, but not limited to, an input interface 721, a de-compressor 722, a data access circuit 723 having a write DMA controller 724 and a read DMA controller 725 included therein, an ISP controller 726, an image processor 727, and a plurality of multiplexers 728, 729. The ISP controller 726 is arranged to control operations of the ISP 704. For example, the ISP controller 726 controls the image processor 727 and the multiplexers 728, 729. Similarly, the ISP 704 may be controlled to operate in a normal/non-decompression mode or a de-compression mode based on the operational mode employed by the camera module 702. The input interface 721 is arranged for receiving the bitstream BS via the camera interface 103, and un-packing the bitstream BS into an input multimedia data D2. More specifically, the input interface 721 un-packetizes the bitstream BS based on the transmission protocol of the camera interface 103. As shown in FIG. 7, the input multimedia data D2 may be fed into the de-compressor 722 for data de-compression, stored into the image buffer 132 via the write DMA controller 724, or directly bypassed to the multiplexer 728. In this embodiment, the data de-compression is applied to the input multimedia data D2 only when the ISP 304 operates under the de-compression mode and the on-the-fly mode is selected for sending the multimedia data to the image processor 727.

As shown in FIG. 7, the multiplexer 728 has a plurality of input ports N31, N32 and an output port N33. The input port N31 is arranged for receiving a de-compressed multimedia data D2' generated from the de-compressor 722 by applying data de-compression to the input multimedia data D2. The input port N32 is arranged for receiving the input multimedia data D2 generated from the input interface 721. The output port N33 is arranged for selectively outputting the input multimedia data D2 or the de-compressed multimedia data D2' as a multiplexer output M3.

Regarding the multiplexer 729 shown in FIG. 7, it has a plurality of input ports N41, N42 and an output port N43. The input port N41 is arranged for receiving the multiplexer output M3 generated from the multiplexer 728. The input port N42 is arranged for receiving the buffered multimedia data D2_BUF (i.e., the input multimedia data D2 stored in the image buffer 132). The output port N43 is arranged for selectively outputting the multiplexer output M3 or the buffered multimedia data D2_BUF as a multiplexer output M4 to the following image processor 727.

In a case where the camera module 702 is implemented using the camera module 102_2 shown in FIG. 3 and the ISP 704 is controlled to operate under the normal/non-decompression mode, the input multimedia data D2 is identical to the input multimedia data D1 shown in FIG. 3 if no error occurs during the transmission. In addition, the de-compressor 722 is disabled or powered off since no data de-compression is needed when the internal transmission mode is set by either of the on-the-fly mode and the off-line mode. When the on-the-fly mode is selected for sending the multimedia data to the image processor 727, the multiplexer 728 selects the input multimedia data D2 as the multiplexer output M3, and the multiplexer 729 selects the multiplexer output M3 as the multiplexer output M4. When the off-line mode is selected for sending the multimedia data to the image processor 727, the input multimedia data D2 is stored into the image buffer 132, and the multiplexer 729 selects the buffered multimedia data D2_BUF as the multiplexer output M4.

In another case where the camera module 702 is implemented using the camera module 102_2 shown in FIG. 3 and the ISP 704 is controlled to operate under the de-compression mode, the de-compressor 722 is enabled or powered on. The input multimedia data D2 is identical to the compressed multimedia data D1' shown in FIG. 3 if no error occurs during the transmission, and the de-compressed multimedia data D2' is identical to the input multimedia data D1 shown in FIG. 3 if lossless compression is applied and no error occurs during data de-compression. It should be noted that only the on-the-fly mode is allowed to be selected for sending the multimedia data to the image processor 727 when the ISP 304 operates under the de-compression mode in this embodiment. Hence, the multiplexer 728 selects the de-compressed multimedia data D2' as the multiplexer output M3, and the multiplexer 729 selects the multiplexer output M3 as the multiplexer output M4.

Briefly summarized, the de-compressor 722 and the image buffer 132 are connected in a parallel fashion. Hence, the image buffer 132 stores un-compressed multimedia data for off-line mode only, and the de-compressor 722 is active in the on-the-fly mode only. The multiplexer 728 configures its internal interconnection based on whether or not the data de-compression is needed when the on-the-fly mode is selected for sending the multimedia data to the image processor 727. The multiplexer 729 configures its internal interconnection based on a selected internal transmission mode, either the on-the-fly mode or the off-line mode. When the compression mode is enabled by the camera module 702, the transmission data rate between the camera module 702 and the ISP 704 is reduced, thus lowering the power consumption of the camera interface 103.

Figure 8:
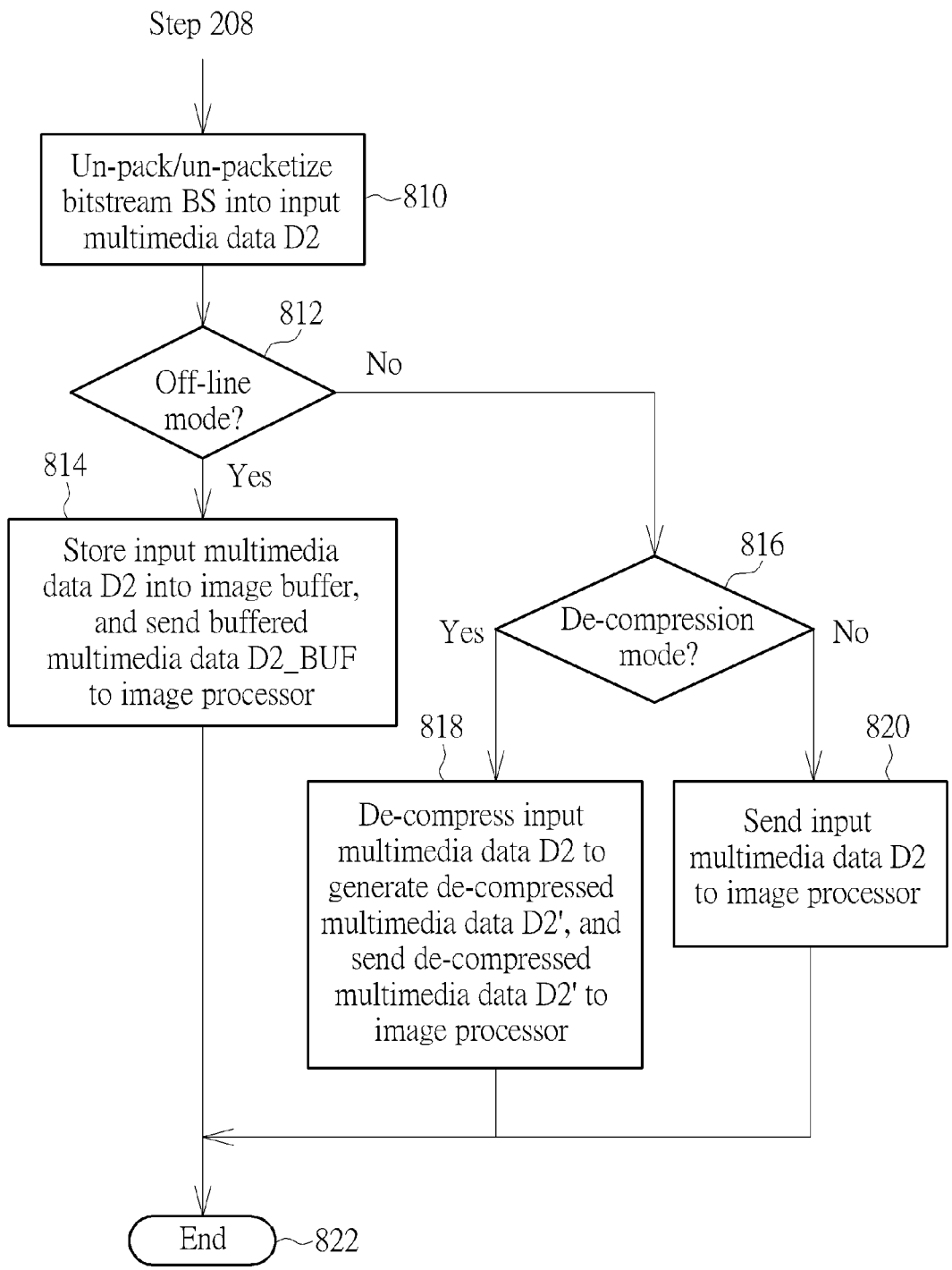
FIG. 8 is a flowchart illustrating a control and data flow of the ISP shown in FIG. 7.

FIG. 8 is a flowchart illustrating a control and data flow of the ISP 704 shown in FIG. 7. Provided that the result is substantially the same, the steps are not required to be executed in the exact order shown in FIG. 8. The steps 202-208 shown in FIG. 2 are also performed by the camera module 702 shown in FIG. 7. Hence, only the steps performed by the ISP 704 are shown in FIG. 8 for simplicity. The exemplary control and data flow of the ISP 704 may be briefly summarized by following steps.

Step 810: Un-pack/un-packetize the bitstream BS into the input multimedia data D2.

Step 812: Check if the off-line mode is selected for sending the multimedia data to the image processor 727. If yes, go to step 814; otherwise, go to step 816.

Step 814: Store the input multimedia data D2 into the image buffer 132, and send the buffered multimedia data D2_BUF (D2_BUF=D2) to the image processor 727. Go to step 822.

Step 816: Check if the de-compression mode is enabled. If yes, go to step 818; otherwise, go to step 820.

Step 818: De-compress the input multimedia data D2 to generate the de-compressed multimedia data D2', and send the de-compressed multimedia data D2' to the image processor 727. Go to step 822.

Step 820: Send the input multimedia data D2 to the image processor 727.

Step 822: End.

As a person skilled in the art can readily understand details of each step shown in FIG. 8 after reading above paragraphs directed to the data processing system 700 shown in FIG. 7, further description is omitted here for brevity.

Figure 9:
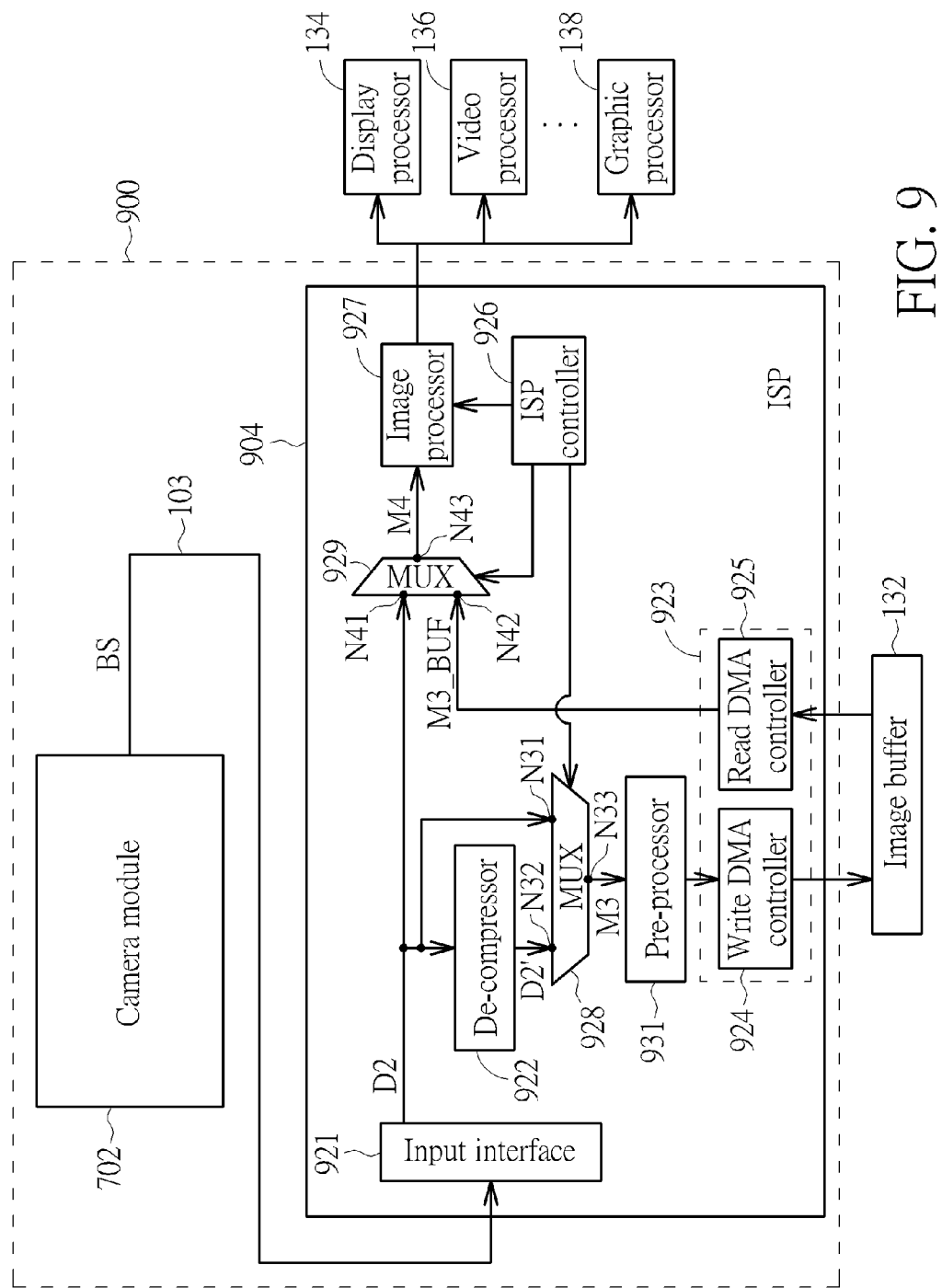
FIG. 9 is a block diagram illustrating a data processing system according to a third embodiment of the present invention.

Please refer to FIG. 9, which is a block diagram illustrating a data processing system according to a third embodiment of the present invention. The data processing system 900 includes a plurality of data processing apparatuses such as the aforementioned camera module 702 (which may be implemented using one of the camera modules 102_1-102_5) and an ISP 904. The camera module 702 and the ISP 904 may be different chips, and the camera module 702 communicates with the ISP 904 via the aforementioned camera interface 103. In this embodiment, the ISP 904 includes, but not limited to, an input interface 921, a de-compressor 922, a data access circuit 923 having a write DMA controller 924 and a read DMA controller 925 included therein, an ISP controller 926, an image processor 927, a plurality of multiplexers 928, 929, and an optional pre-processor 931. The ISP controller 926 is arranged to control operations of the ISP 904. For example, the ISP controller 926 controls the image processor 927 and the multiplexers 928, 929. Similarly, the ISP 904 may operate in the normal/non-decompression mode or a de-compression mode based on the operational mode employed by the camera module 702. The input interface 921 is arranged for receiving the bitstream BS via the camera interface 103, and un-packing the bitstream BS into an input multimedia data D2. More specifically, the input interface 921 un-packetizes the bitstream BS based on the transmission protocol of the camera interface 103. As shown in FIG. 9, the input multimedia data D2 may be fed into the de-compressor 922 for data de-compression, directly bypassed to the multiplexer 928, or directly bypassed to the multiplexer 929. In this embodiment, the data de-compression is applied to the input multimedia data D2 only when the ISP 904 operates under the de-compression mode and the off-line mode is selected for sending the multimedia data to the image processor 927.

As shown in FIG. 9, the multiplexer 928 has a plurality of input ports N31, N32 and an output port N33. The input port N32 is arranged for receiving a de-compressed multimedia data D2' generated from the de-compressor 922 by applying data de-compression to the input multimedia data D2. The input port N31 is arranged for receiving the input multimedia data D2 generated from the input interface 921. The output port N33 is arranged for selectively outputting the input multimedia data D2 or the de-compressed multimedia data D2' as a multiplexer output M3.

Regarding the multiplexer 929 shown in FIG. 9, it has a plurality of input ports N41, N42 and an output port N43. The input port N41 is arranged for receiving the input multimedia data D2 generated from the input interface 921. The input port N42 is arranged for receiving the buffered multimedia data M3_BUF (i.e., the multiplexer output M3 stored in the image buffer 132). The output port N43 is arranged for selectively outputting the input multimedia data D2 or the buffered multimedia data M3_BUF as a multiplexer output M4 to the following image processor 927.

It should be noted that image pre-processing may be applied to the multimedia data before the multimedia data is processed by the image processor 927. As each image pre-processing operation is not designed to process compressed multimedia data, the pre-processor 931 is therefore located behind the de-compressor 922. In this embodiment, the pre-processor 931 is located before the write DMA controller 924. Hence, image pre-processing operation(s) may be applied to the multiplexer output M3 before the multiplexer output M3 is stored into the image buffer 132. Alternatively, the pre-processor 931 may be located after the read DMA controller 925. Hence, image pre-processing operation(s) may be applied to the buffered multimedia data M3_BUF before the buffered multimedia data M3_BUF is provided to the input port N42 of the multiplexer 929.

In a case where the camera module 702 is implemented using the camera module 102_2 shown in FIG. 3 and the ISP 904 is controlled to operate under the normal/non-decompression mode, the input multimedia data D2 is identical to the input multimedia data D1 shown in FIG. 3 if no error occurs during the transmission. In addition, the de-compressor 526 is disabled or powered off since no data de-compression is needed when the internal transmission mode is set by either of on-the-fly mode and off-line mode. When the on-the-fly mode is selected for sending the multimedia data to the image processor 927, the multiplexer 929 selects the input multimedia data D2 as the multiplexer output M4. When the off-line mode is selected for sending the multimedia data to the image processor 927, the multiplexer 928 selects the input multimedia data D2 as the multiplexer output M3, the multiplexer output M3 is stored into the image buffer 132, and the multiplexer 929 selects the buffered multimedia data M3_BUF as the multiplexer output M4.

In another case where the camera module 702 is implemented using the camera module 102_2 shown in FIG. 3 and the ISP 904 is controlled to operate under the de-compression mode, the de-compressor 922 is enabled or powered on. The input multimedia data D2 is identical to the compressed multimedia data D1' shown in FIG. 3 if no error occurs during the transmission, and the de-compressed multimedia data D2' is identical to the input multimedia data D1 shown in FIG. 3 if lossless compression is applied and no error occurs during data de-compression. It should be noted that only the off-line mode is allowed to be selected for sending the multimedia data to the image processor 927 when the ISP 904 operates under the de-compression mode in this embodiment. Hence, the multiplexer 928 selects the de-compressed multimedia data D2' as the multiplexer output M3, and the multiplexer 929 selects the buffered display output M3_BUF as the multiplexer output M4.

Briefly summarized, the image buffer 132 stores un-compressed multimedia data or de-compressed multimedia data for off-line mode, and the de-compressor 922 is active in the off-line mode only. The multiplexer 928 configures its internal interconnection based on whether or not the data de-compression is needed when the off-line mode is selected for sending the multimedia data to the image processor 927. The multiplexer 929 configures its internal interconnection based on the selected internal transmission mode, either the on-the-fly mode or the off-line mode. When the compression mode is enabled by the camera module 702, the transmission data rate between the camera module 702 and the ISP 904 is reduced, thus lowering the power consumption of the camera interface 103.

Figure 10:
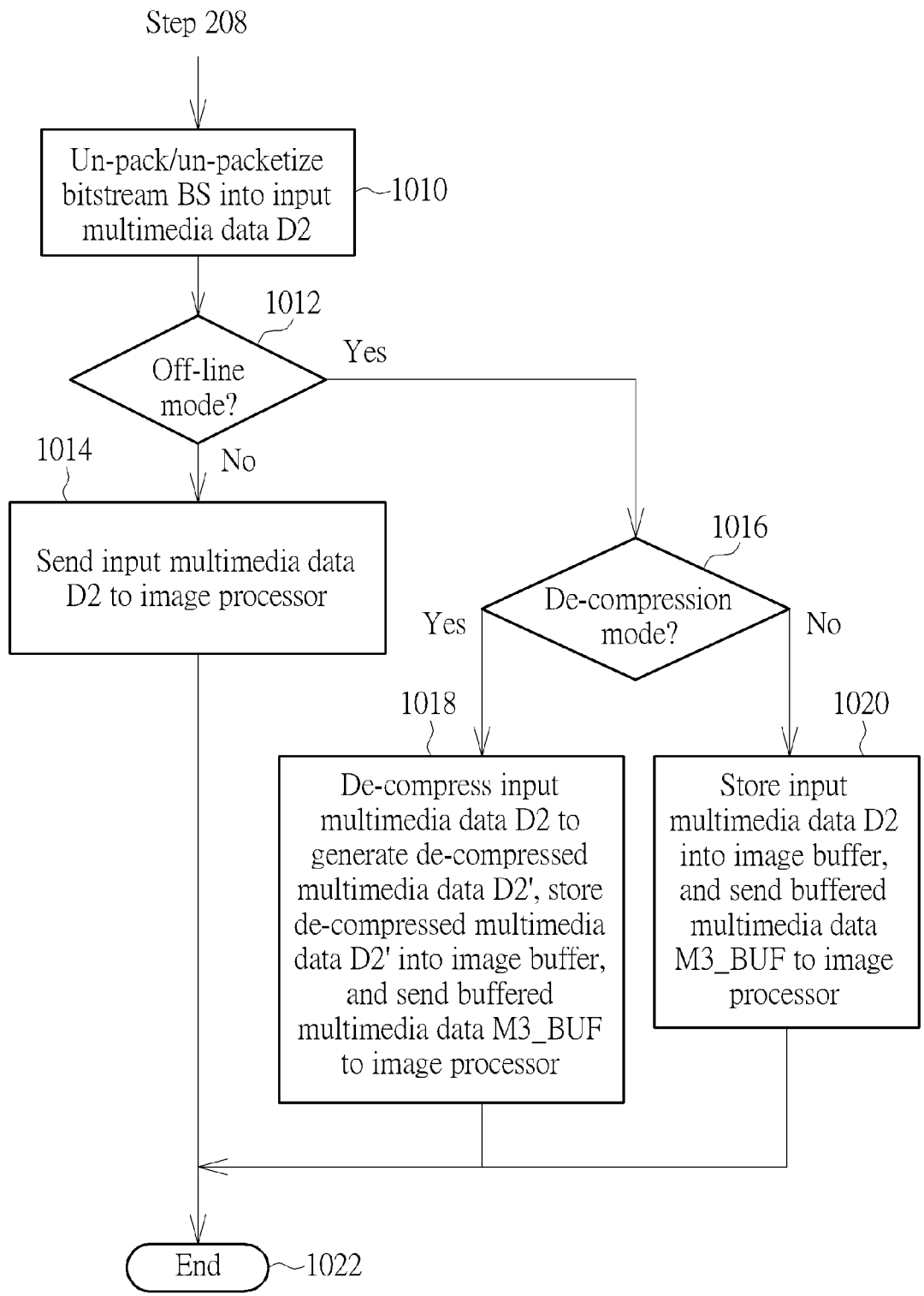
FIG. 10 is a flowchart illustrating a control and data flow of the ISP shown in FIG. 9.

FIG. 10 is a flowchart illustrating a control and data flow of the ISP 904 shown in FIG. 9. Provided that the result is substantially the same, the steps are not required to be executed in the exact order shown in FIG. 10. The steps 202-208 shown in FIG. 2 are also performed by the camera module 702 shown in FIG. 9. Hence, only the steps performed by the ISP 904 are shown in FIG. 10 for simplicity. The exemplary control and data flow of the ISP 904 may be briefly summarized by following steps.

Step 1010: Un-pack/un-packetize the bitstream BS into the input multimedia data D2.

Step 1012: Check if the off-line mode is selected for sending the multimedia data to the image processor 927. If yes, go to step 1016; otherwise, go to step 1014.

Step 1014: Send the input multimedia data D2 to the image processor 927.

Step 1016: Check if the de-compression mode is enabled. If yes, go to step 1018; otherwise, go to step 1020.

Step 1018: De-compress the input multimedia data D2 to generate the de-compressed multimedia data D2', store the de-compressed multimedia data D2' into the image buffer 132, and send the buffered multimedia data M3_BUF (M3_BUF=D2') to the image processor 927. Go to step 1022.

Step 1020: Store the input multimedia data D2 into the image buffer 132, and send the buffered multimedia data M3_BUF (M3_BUF=D2) to the image processor 927.

Step 1022: End.

As a person skilled in the art can readily understand details of each step shown in FIG. 10 after reading above paragraphs directed to the data processing system 900 shown in FIG. 9, further description is omitted here for brevity.

Figure 11:
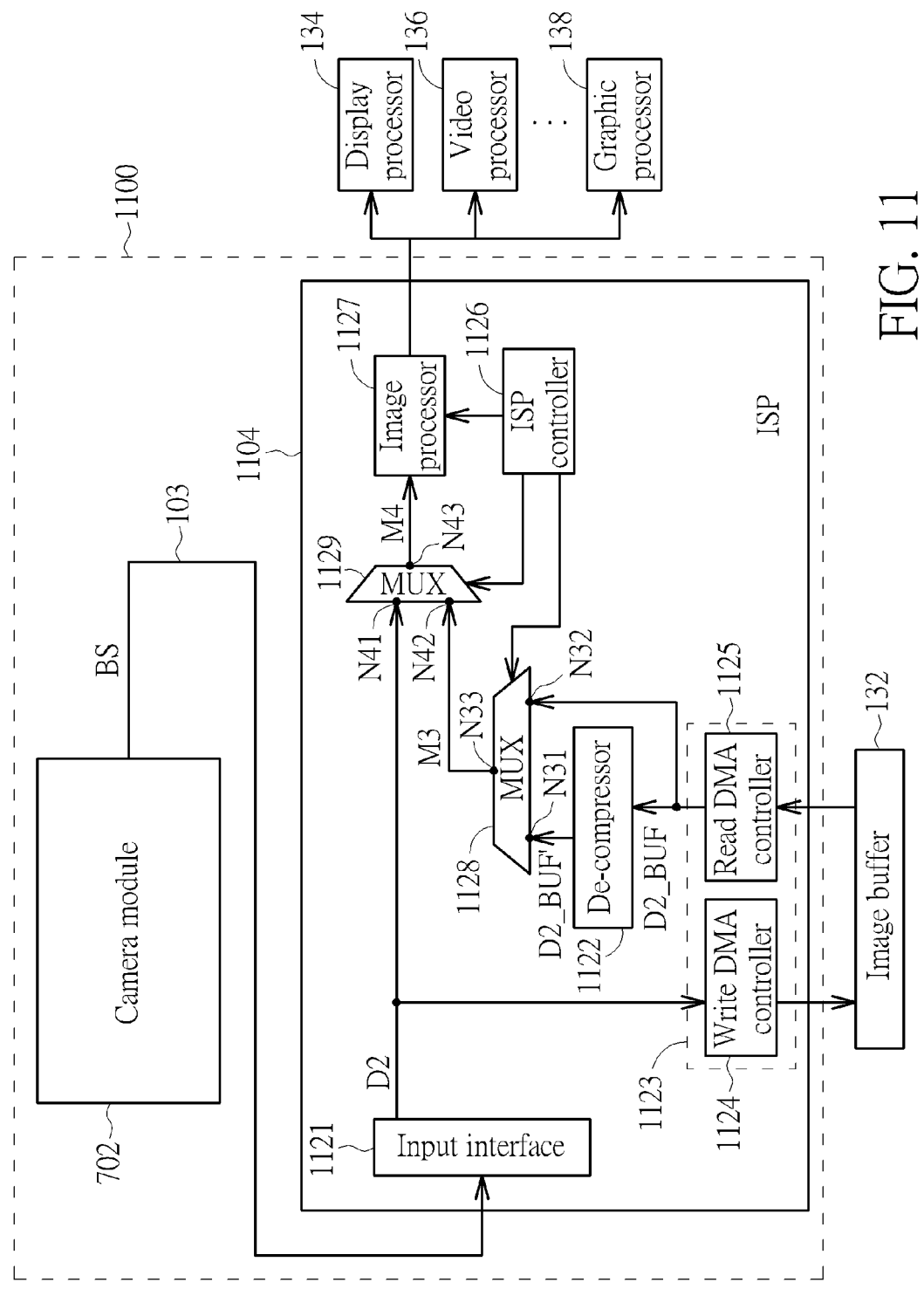
FIG. 11 is a block diagram illustrating a data processing system according to a fourth embodiment of the present invention.

Please refer to FIG. 11, which is a block diagram illustrating a data processing system according to a fourth embodiment of the present invention. The data processing system 1100 includes a plurality of data processing apparatuses such as the aforementioned camera module 702 (which may be implemented using one of the camera modules 102_1-102_5) and an ISP 1104. The camera module 702 and the ISP 1104 may be different chips, and the camera module 702 communicates with the ISP 1104 via the aforementioned camera interface 103. In this embodiment, the ISP 1104 includes, but not limited to, an input interface 1121, a de-compressor 1122, a data access circuit 1123 having a write DMA controller 1124 and a read DMA controller 1125 included therein, an ISP controller 1126, an image processor 1127, and a plurality of multiplexers 1128, 1129. The ISP controller 1126 is arranged to control operations of the ISP 1104. For example, the ISP controller 1126 controls the image processor 1127 and the multiplexers 1128, 1129. Similarly, the ISP 1104 may operate in the normal/non-decompression mode or a de-compression mode based on the operational mode employed by the camera module 702. The input interface 1121 is arranged for receiving the bitstream BS via the camera interface 103, and un-packing the bitstream BS into an input multimedia data D2. More specifically, the input interface 1121 un-packetizes the bit-stream BS based on the transmission protocol of the camera interface 103. As shown in FIG. 11, the input multimedia data D2 may be fed into the image buffer 132 via the write DMA controller 1124 or directly bypassed to the multiplexer 1129. More specifically, the data de-compression is applied to the input multimedia data D2 stored in the image buffer 132 (i.e., the buffered multimedia data D2_BUF) only when the ISP 1104 operates under the de-compression mode and the off-line mode is selected for sending the multimedia data to the image processor 1127.

As shown in FIG. 11, the multiplexer 1128 has a plurality of input ports N31, N32 and an output port N33. The input port N32 is arranged for receiving the buffered multimedia data D2_BUF read from the image buffer 132 by the read DMA controller 1125. The input port N31 is arranged for receiving a de-compressed multimedia data D2_BUF' generated from the de-compressor 1122 by applying data de-compression to the buffered multimedia data D2_BUF. The output port N33 is arranged for selectively outputting the buffered multimedia data D2_BUF or the de-compressed multimedia data D2_BUF' as a multiplexer output M3.

Regarding the multiplexer 1129 shown in FIG. 11, it has a plurality of input ports N41, N42 and an output port N43. The input port N41 is arranged for receiving the input multimedia data D2 generated from the input interface 1121. The input port N42 is arranged for receiving the multiplexer output M3. The output port N43 is arranged for selectively outputting the input multimedia data D2 or the multiplexer output M2 as a multiplexer output M4 to the following image processor 1127.

In a case where the camera module 702 is implemented using the camera module 102_2 shown in FIG. 3 and the ISP 1104 is controlled to operate under the normal/non-decompression mode, the input multimedia data D2 is identical to the input multimedia data D1 shown in FIG. 3 if no error occurs during the transmission. In addition, the de-compressor 1122 is disabled or powered off since no data de-compression is needed when the display mode is set by either of the on-the-fly mode and the off-line mode. When the on-the-fly mode is selected for sending the multimedia data to the image processor 1127, the multiplexer 1129 selects the input multimedia data D2 as the multiplexer output M4. When the off-line mode is selected for sending the multimedia data to the image processor 1127, the multiplexer 1128 selects the buffered multimedia data D2_BUF as the multiplexer output M3, and the multiplexer 1129 selects the multiplexer output M3 as the multiplexer output M4.

In another case where the camera module 702 is implemented using the camera module 102_2 shown in FIG. 3 and the ISP 1104 is controlled to operate under the de-compression mode, the de-compressor 1122 is enabled or powered on. The input multimedia data D2 is identical to the compressed input multimedia data D1' shown in FIG. 3 if no error occurs during the transmission, and the de-compressed multimedia data D2_BUF' is identical to the input multimedia data D1 shown in FIG. 3 if lossless compression is applied and no error occurs during data de-compression and data buffering. It should be noted that only the off-line mode is allowed to be selected for sending the multimedia data to the image processor 1127 when the ISP 1104 operates under the de-compression mode in this embodiment. Hence, the multiplexer 1128 selects the de-compressed multimedia data D2_BUF' as the multiplexer output M3, and the multiplexer 1129 selects the multiplexer output M3 as the multiplexer output M4.

Briefly summarized, the image buffer 132 stores uncompressed multimedia data or compressed multimedia data for off-line mode, and the de-compressor 1122 is active in the off-line mode only. The multiplexer 1128 configures its internal interconnection based on whether or not the data de-compression is needed when the off-line mode is selected for sending the multimedia data to the image processor 1127. The multiplexer 1129 configures its internal interconnection based on the selected internal transmission mode, either the on-the-fly mode or the off-line mode. When the compression mode is enabled by the camera module 702, the transmission data rate between the camera module 702 and the ISP 1104 is reduced, thus lowering the power consumption of the camera interface 103.

Figure 12:
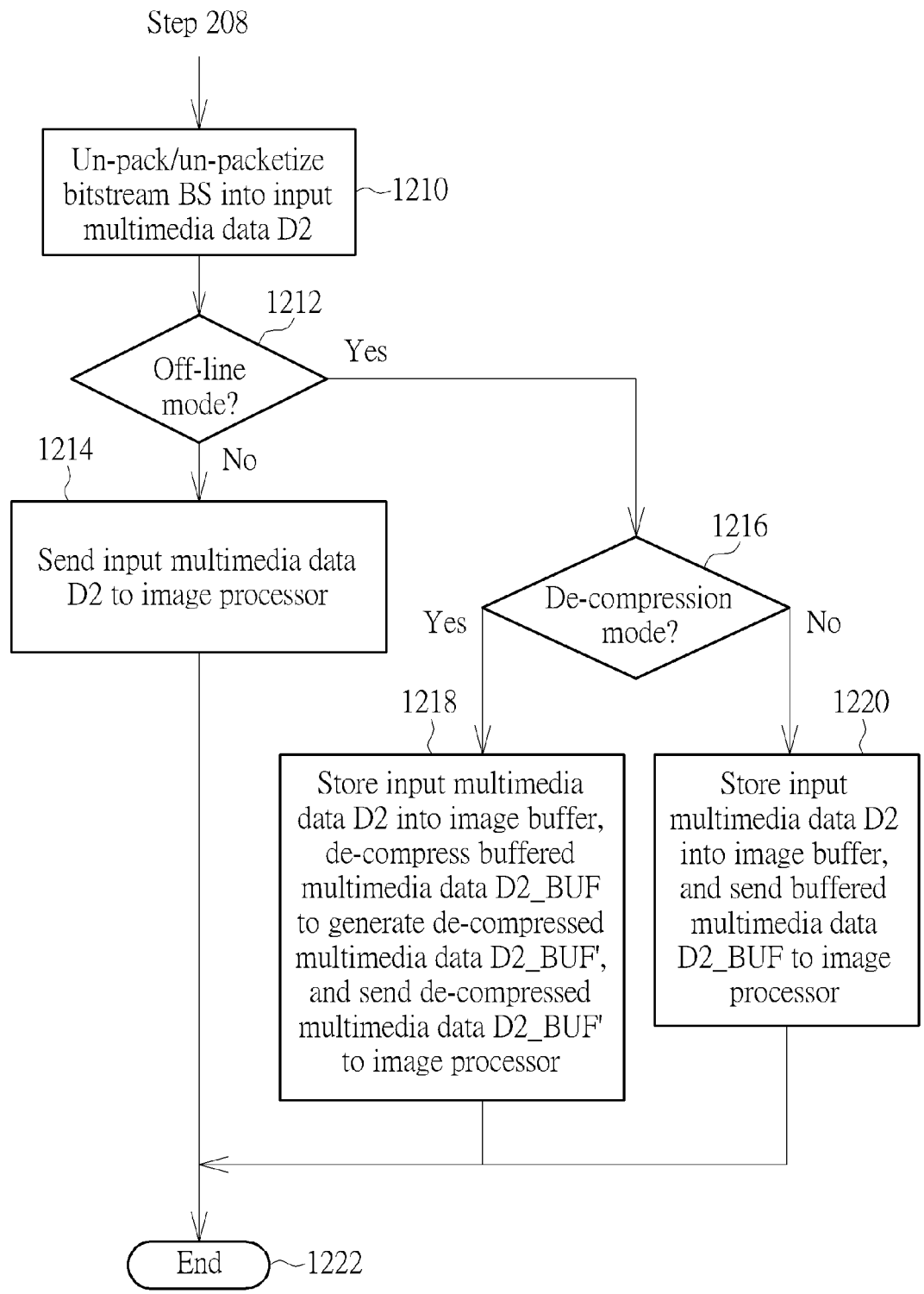
FIG. 12 is a flowchart illustrating a control and data flow of the ISP shown in FIG. 11.

FIG. 12 is a flowchart illustrating a control and data flow of the ISP 1104 shown in FIG. 11. Provided that the result is substantially the same, the steps are not required to be executed in the exact order shown in FIG. 12. The steps 202-208 shown in FIG. 2 are also performed by the camera module 702 shown in FIG. 11. Hence, only the steps performed by the ISP 1104 are shown in FIG. 12 for simplicity. The exemplary control and data flow of the ISP 1104 may be briefly summarized by following steps.

Step 1210: Un-pack/un-packetize the bitstream BS into the input multimedia data D2.

Step 1212: Check if the off-line mode is selected for sending the multimedia data to the image processor 1127. If yes, go to step 1216; otherwise, go to step 1214.

Step 1214: Send the input multimedia data D2 to the image processor 1127. Go to step 1222.

Step 1216: Check if the de-compression mode is enabled. If yes, go to step 1218; otherwise, go to step 1220.

Step 1218: Store the input multimedia data D2 into the image buffer 132, de-compress the buffered multimedia data D2_BUF (D2_BUF=D2) to generate the de-compressed multimedia data D2_BUF', and send the de-compressed multimedia data D2_BUF' to the image processor 1127. Go to step 1222.

Step 1220: Store the input multimedia data D2 into the image buffer 132, and send the buffered multimedia data D2_BUF (D2_BUF=D2) to the image processor 1127.

Step 1222: End.

As a person skilled in the art can readily understand details of each step shown in FIG. 12 after reading above paragraphs directed to the data processing system 1100 shown in FIG. 11, further description is omitted here for brevity.

Figure 13:
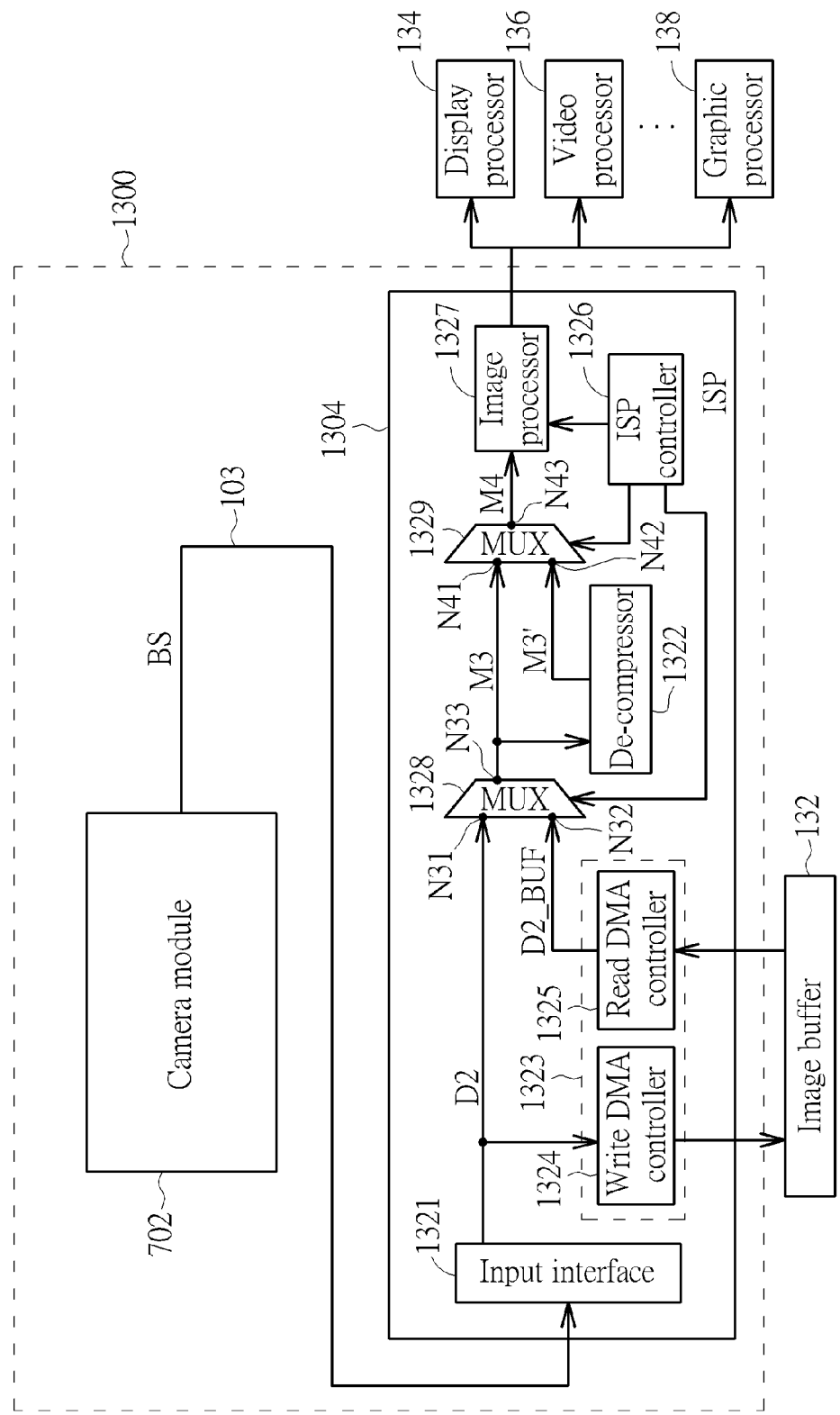
FIG. 13 is a block diagram illustrating a data processing system according to a fifth embodiment of the present invention.

Please refer to FIG. 13, which is a block diagram illustrating a data processing system according to a fifth embodiment of the present invention. The data processing system 1300 includes a plurality of data processing apparatuses such as the aforementioned camera module 702 (which may be implemented using one of the camera modules 102_1-102_5) and an ISP 1304. The camera module 702 and the ISP 1304 may be different chips, and the camera module 702 communicates with the ISP 1304 via the aforementioned camera interface 103. In this embodiment, the ISP 1304 includes, but not limited to, an input interface 1321, a de-compressor 1322, a data access circuit 1323 having a write DMA controller 1324 and a read DMA controller 1325 included therein, an ISP controller 1326, an image processor 1327, and a plurality of multiplexers 1328, 1329. The ISP controller 1326 is arranged to control operations of the ISP 1304. For example, the ISP controller 1326 controls the image processor 1327 and the multiplexers 1328, 1329. Similarly, the ISP 1304 may operate in the normal/non-decompression mode or the de-compression mode based on the operational mode employed by the camera module 702. The input interface 1321 is arranged for receiving the bitstream BS via the camera interface 103, and un-packing the bitstream BS into an input multimedia data D2. More specifically, the input interface 1321 un-packetizes the bitstream BS based on the transmission protocol of the camera interface 103. As shown in FIG. 13, the input multimedia data D2 may be fed into the image buffer 132 via the write DMA controller 1324 or directly bypassed to the multiplexer 1328. In this embodiment, the data de-compression may be applied to the input multimedia data D2 or the input multimedia data D2 stored in the image buffer 132 (i.e., a buffered multimedia data D2_BUF).

As shown in FIG. 13, the multiplexer 1328 has a plurality of input ports N31, N32 and an output port N33. The input port N31 is arranged for receiving the input multimedia data D2 generated from the input interface 1321. The input port N32 is arranged for receiving the buffered multimedia data D2_BUF read from the image buffer 132 by the read DMA controller 1325. The output port N33 is arranged for selectively outputting the input multimedia data D2 or the buffered multimedia data D2_BUF as a multiplexer output M3.

Regarding the multiplexer 1329 shown in FIG. 13, it has a plurality of input ports N41, N42 and an output port N43. The input port N42 is arranged for receiving a de-compressed multimedia data M3' generated from the de-compressor 1322 by applying data de-compression to the multiplexer output M3. The input port N41 is arranged for receiving the multiplexer output M3 from the multiplexer 1328. The output port N43 is arranged for selectively outputting the multiplexer output M3 or the de-compressed multimedia data M3' as a multiplexer output M4 to the following image processor 1327.

In a case where the camera module 702 is implemented using the camera module 102_2 shown in FIG. 3 and the ISP 1304 is controlled to operate under the normal/non-decompression mode, the input multimedia data D2 is identical to the input multimedia data D1 shown in FIG. 3 if no error occurs during the transmission. In addition, the de-compressor 1322 is disabled or powered off since no data de-compression is needed when the display mode is set by either of the on-the-fly mode and the off-line mode. When the on-the-fly mode is selected for sending the multimedia data to the image processor 1327, the multiplexer 1328 selects the input multimedia data D2 as the multiplexer output M3, and the multiplexer 1329 selects the multiplexer output M3 as the multiplexer output M4. When the off-line mode is selected for sending the multimedia data to the image processor 1327, the multiplexer 1328 selects the buffered multimedia data D2_BUF (i.e., the input multimedia data D2 stored in the image buffer 132) as the multiplexer output M3, and the multiplexer 1329 selects the multiplexer output M3 as the multiplexer output M4.

In another case where the camera module 702 is implemented using the camera module 102_2 shown in FIG. 3 and the ISP 1304 is controlled to operate under the de-compression mode, the de-compressor 1322 is enabled or powered on. The input multimedia data D2 is identical to the compressed input multimedia data D1' shown in FIG. 3 if no error occurs during the transmission, and the de-compressed multimedia data M2' is identical to the input multimedia data D1 shown in FIG. 3 if lossless compression is applied and no error occurs during data-decompression and/or data buffering. When the on-the-fly mode is selected for sending the multimedia data to the image processor 1327, the multiplexer 1328 selects the input multimedia data D2 as the multiplexer output M3, and the multiplexer 1329 selects the de-compressed multimedia data M3' generated from applying data de-compression to the multiplexer output M3 as the multiplexer output M4. When the off-line mode is selected for sending the multimedia data to the image processor 1327, the multiplexer 1328 selects the buffered multimedia data D2_BUF as the multiplexer output M3, and the multiplexer 1329 selects the de-compressed multimedia data M3' as the multiplexer output M4.

Briefly summarized, the image buffer 132 stores compressed multimedia data for off-line mode, and the de-compressor 1322 is active in both of on-the-fly mode and off-line mode. The multiplexer 1328 configures its internal interconnection based on the selected internal transmission mode, either the on-the-fly mode or the off-line mode. The multiplexer 1329 configures its internal interconnection based on whether or not the data de-compression is needed. When the compression mode is enabled by the camera module 702, the transmission data rate between the camera module 702 and the ISP 1304 is reduced, thus lowering the power consumption of the camera interface 103.

Figure 14:
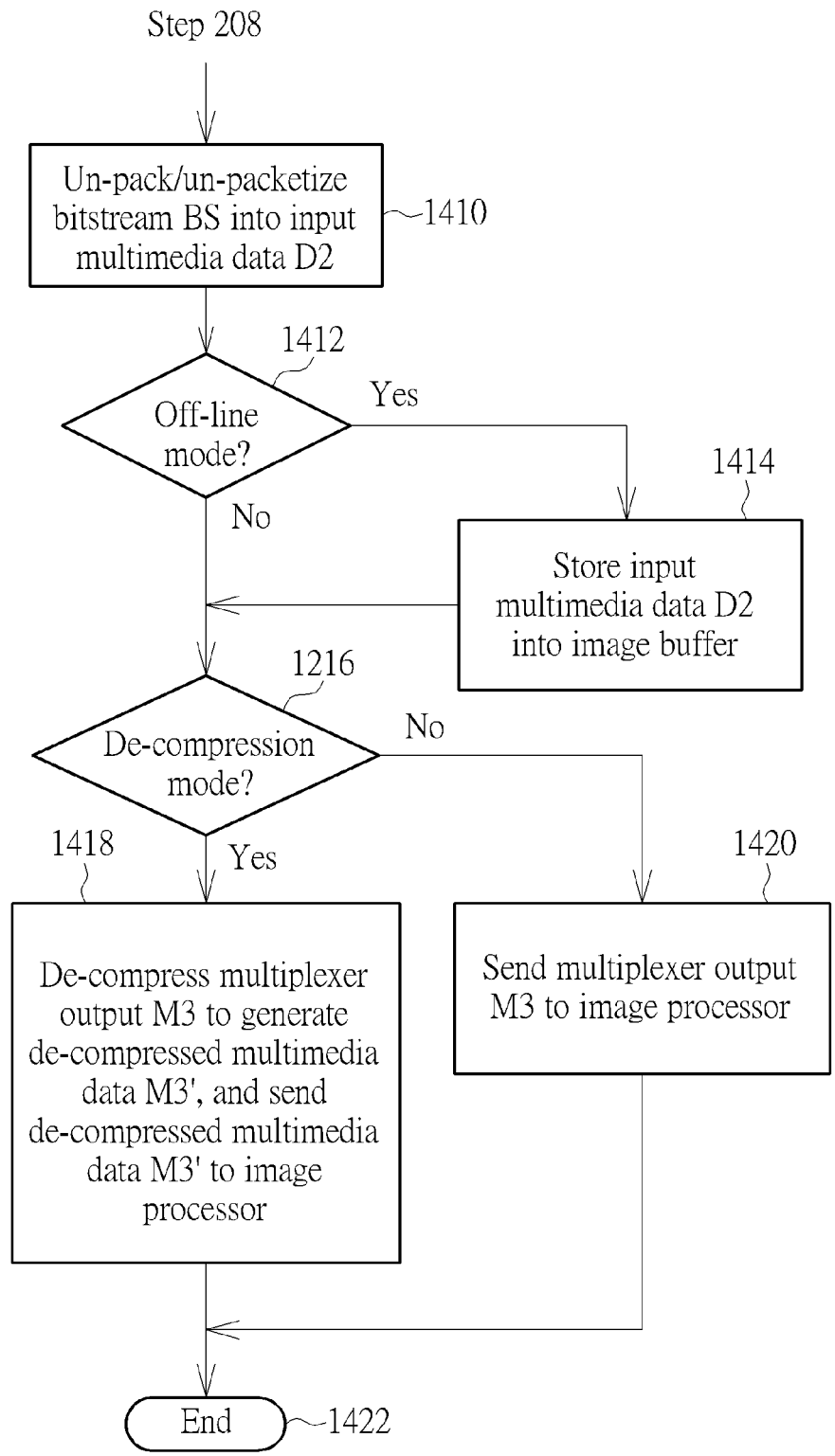
FIG. 14 is a flowchart illustrating a control and data flow of the ISP shown in FIG. 13.

FIG. 14 is a flowchart illustrating a control and data flow of the ISP 1304 shown in FIG. 13. Provided that the result is substantially the same, the steps are not required to be executed in the exact order shown in FIG. 14. The steps 202-208 shown in FIG. 2 are also performed by the camera module 702 shown in FIG. 13. Hence, only the steps performed by the ISP 1304 are shown in FIG. 14 for simplicity. The exemplary control and data flow of the ISP 1304 may be briefly summarized by following steps.

Step 1410: Un-pack/un-packetize the bitstream BS into the input multimedia data D2.
Step 1412: Check if the off-line mode is selected for sending the multimedia data to the image processor 1327. If yes, go to step 1414; otherwise, go to step 1416.
Step 1414: Store the input multimedia data D2 into the image buffer 132.
Step 1416: Check if the de-compression mode is enabled. If yes, go to step 1418; otherwise, go to step 1420.
Step 1418: De-compress the multiplexer output M3 (M3=D2 or D2_BUF) to generate the de-compressed multimedia data M3', and send the de-compressed multimedia data M3' to the image processor 1327. Go to step 1422.
Step 1420: Send the multiplexer output M3 to the image processor 1327.
Step 1422: End.

As a person skilled in the art can readily understand details of each step shown in FIG. 14 after reading above paragraphs directed to the data processing system 1300 shown in FIG. 13, further description is omitted here for brevity.

In above exemplary implementation of the camera module, the camera module is designed to have a compressor included therein to support data compression. However, this is for illustrative purposes only, and is not meant to be a limitation of the present invention. In an alternative design, the compressor may be implemented in a bridge IC located between a preceding camera module and a following ISP.

Figure 15:
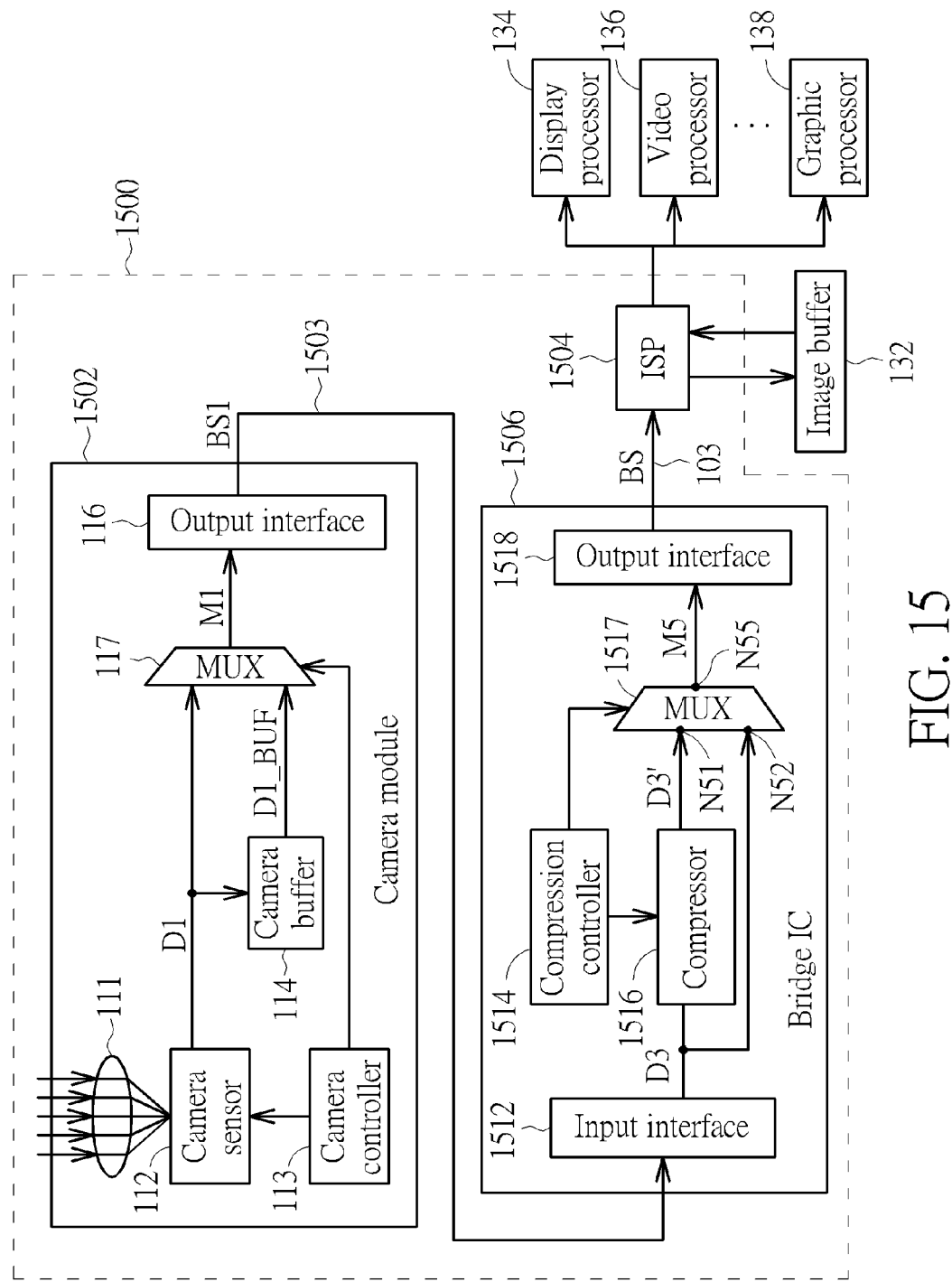
FIG. 15 is a block diagram illustrating a data processing system according to a sixth embodiment of the present invention.

Please refer to FIG. 15, which is a block diagram illustrating a data processing system according to a sixth embodiment of the present invention. The data processing system 1500 includes a plurality of data processing apparatuses such as a camera module 1502, an ISP 1504 and a bridge IC 1506. The camera module 1502, the ISP 1504 and the bridge IC 1506 may be different chips, where the camera module 1502 communicates with the bridge IC 1506 via a camera interface 1503, and the bridge IC 1506 communicates with the ISP 1504 via the aforementioned camera interface 103. By way of example, but not limitation, the camera interface 1503 may be a camera serial interface (CSI) standardized by a Mobile Industry Processor Interface (MIPI).

The camera module 1502 includes the aforementioned lens module 111, camera sensor 112, camera controller 113, camera buffer 114, output interface 116, and multiplexer 117. Thus, the camera module 1502 is arranged for generating an input multimedia data D1, storing the input multimedia data D1 into the camera buffer 114, selecting one of the input multimedia data D1 and the input multimedia data D1 stored in the camera buffer 114 (i.e., the buffered multimedia data D1_BUF) as the multiplexer output M1, packing/packetizing the multiplexer output M1 into a bitstream BS1, and outputting the bitstream BS1 via the camera interface 1503.

In this embodiment, the bridge IC 1506 is coupled between the camera module 1502 and the ISP 1504, and includes, but not limited to, an input interface 1512, a compression controller 1514, a compressor 1516, a multiplexer 1517, and an output interface 1518. The compression controller 1514 is arranged to control operations of the bridge IC 1506. For example, the compression controller 1514 controls the compressor 1516 and the multiplexer 1517. The bridge IC 1506 may operate in a normal/non-compression mode or a compression mode. The input interface 1512 is arranged for receiving the bitstream BS1 via the camera interface 1503, and un-packing the bitstream BS1 into an input multimedia data D3. More specifically, the input interface 1512 un-packetizes the bitstream BS1 based on the transmission protocol of the camera interface 1503.

As shown in FIG. 15, the multiplexer 1517 has a plurality of input ports N51, N52 and an output port N53. The input port N51 is arranged for receiving a compressed multimedia data D3' generated from the compressor 1516 by applying data compression to the input multimedia data D3. The input port N52 is arranged for receiving the input multimedia data D3 generated from the input interface 1512. The output port N53 is arranged for selectively outputting the input multimedia data D3 or the compressed multimedia data D3' as a multiplexer output M5. When the compression controller 1514 controls the bridge IC 1506 to operate under the normal/non-compression mode, the compressor 1516 is disabled or powered off, and the multiplexer 1517 selects the input multimedia data D3 as the multiplexer output M5 to the following output interface 1518. When the compression controller 1514 controls the bridge IC 1506 to operate under the compression mode, the compressor 1516 is enabled or powered on to receive the input multimedia data D3 and generate the compressed multimedia data D3' according to the received input multimedia data D3, and the multiplexer 1517 selects the compressed multimedia data D3' as the multiplexer output M5 to the following output interface

1518. It should be noted that the compressor 1516 may employ a lossy or lossless compression algorithm, depending upon actual design consideration/requirement. The output interface 1518 is arranged for packing the multiplexer output M5 into the bitstream BS and outputting the bitstream BS via the camera interface 103. More specifically, the output interface 1518 packetizes the multiplexer output M5 based on the transmission protocol of the camera interface 103.

The ISP 1504 is arranged for receiving the bitstream BS via the camera interface 103, and generates a processed multimedia data to one or multiple processors (e.g., display processor 134, video processor 136, and/or graphic processor 138). Besides, when the employed internal transmission mode is the off-line mode, the ISP 1504 stores a multimedia data into the image buffer 132, and read a buffered multimedia data from the image buffer 132. In this embodiment, the ISP 1304 may be implemented using one of the aforementioned ISPs 104, 704, 904, 1104, 1304. Further description is omitted here for brevity.

As the bridge IC 1506 is equipped with data compression capability, the camera module 1502 is allowed to be implemented using any compressor-free camera module. The same objective of reducing the transmission data rate over a camera interface (e.g., 103) between a camera module and an ISP for power consumption reduction is achieved.

Figure 16:
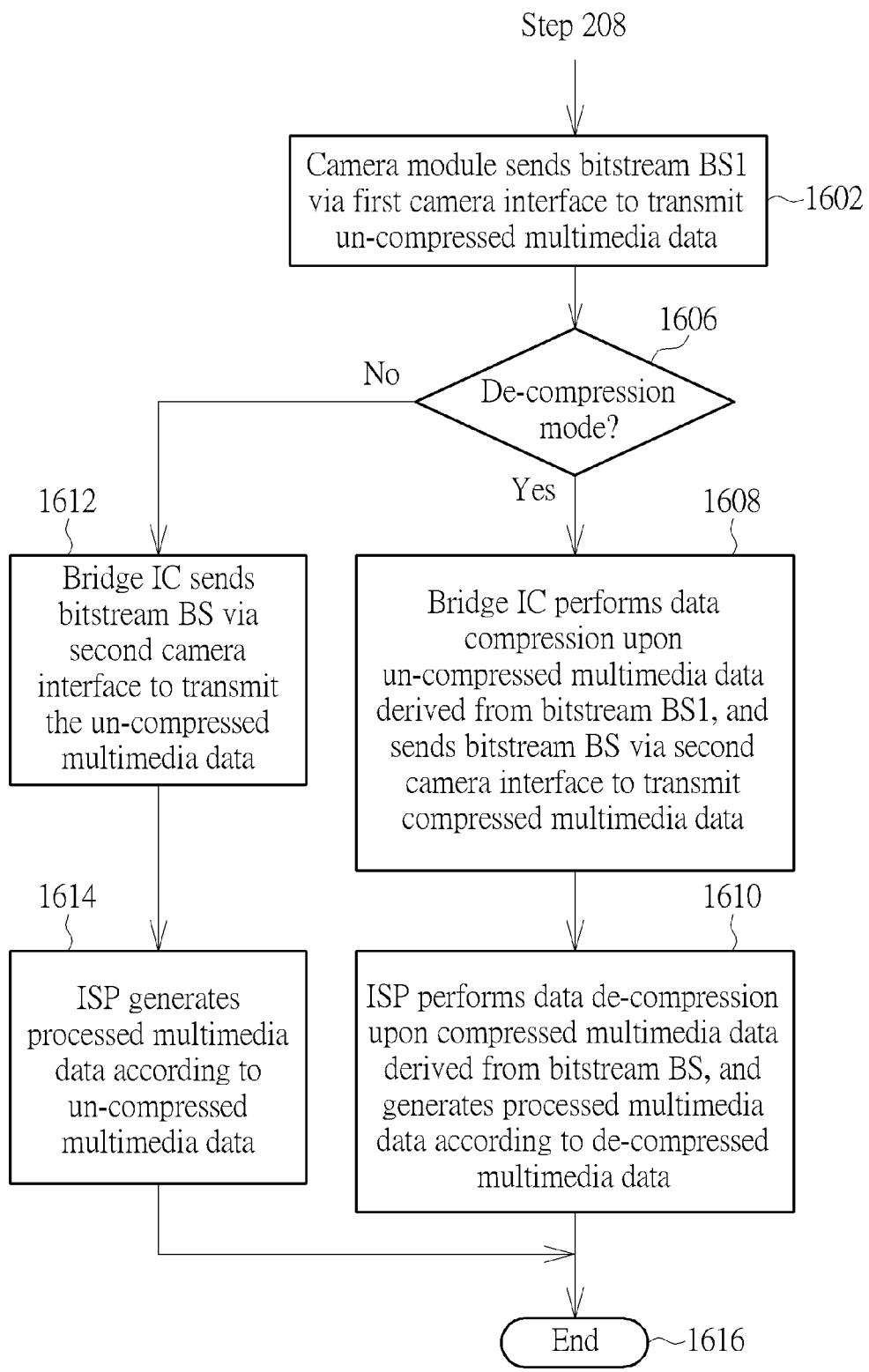
FIG. 16 is a flowchart illustrating a control and data flow of the data processing system shown in FIG. 15.

FIG. 16 is a flowchart illustrating a control and data flow of the data processing system 1500 shown in FIG. 15. Provided that the result is substantially the same, the steps are not required to be executed in the exact order shown in FIG. 16. The exemplary control and data flow may be briefly summarized by following steps.

Step 1600: Start.
Step 1602: The camera module 1502 sends the bitstream BS1 via the camera interface 1503 to transmit un-compressed multimedia data.
Step 1606: Check if the compression mode is enabled. If yes, go to step 1608; otherwise, go to step 1612.
Step 1608: The bridge IC 1606 performs data compression upon the un-compressed multimedia data derived from the bitstream BS1, and sends the bitstream BS via the camera interface 103 to transmit the compressed multimedia data.
Step 1610: The ISP 1504 performs data de-compression upon the compressed multimedia data derived from the bitstream BS, and generates a processed multimedia data according to the de-compressed multimedia data. Go to step 1616.
Step 1612: The bridge IC 1306 sends the bitstream BS via the camera interface 103 to transmit the un-compressed multimedia data.
Step 1614: The ISP 1504 generates a processed multimedia data according to the un-compressed multimedia data.
Step 1616: End.

As a person skilled in the art can readily understand details of each step shown in FIG. 16 after reading above paragraphs directed to the data processing system 1500 shown in FIG. 15, further description is omitted here for brevity.

In above exemplary implementation of the ISP, the ISP is designed to have the de-compressor included therein to support data de-compression. However, this is for illustrative purposes only, and is not meant to be a limitation of the present invention. In an alternative design, the de-compressor may be implemented in a bridge IC located between a preceding camera module and a following ISP.

Figure 17:
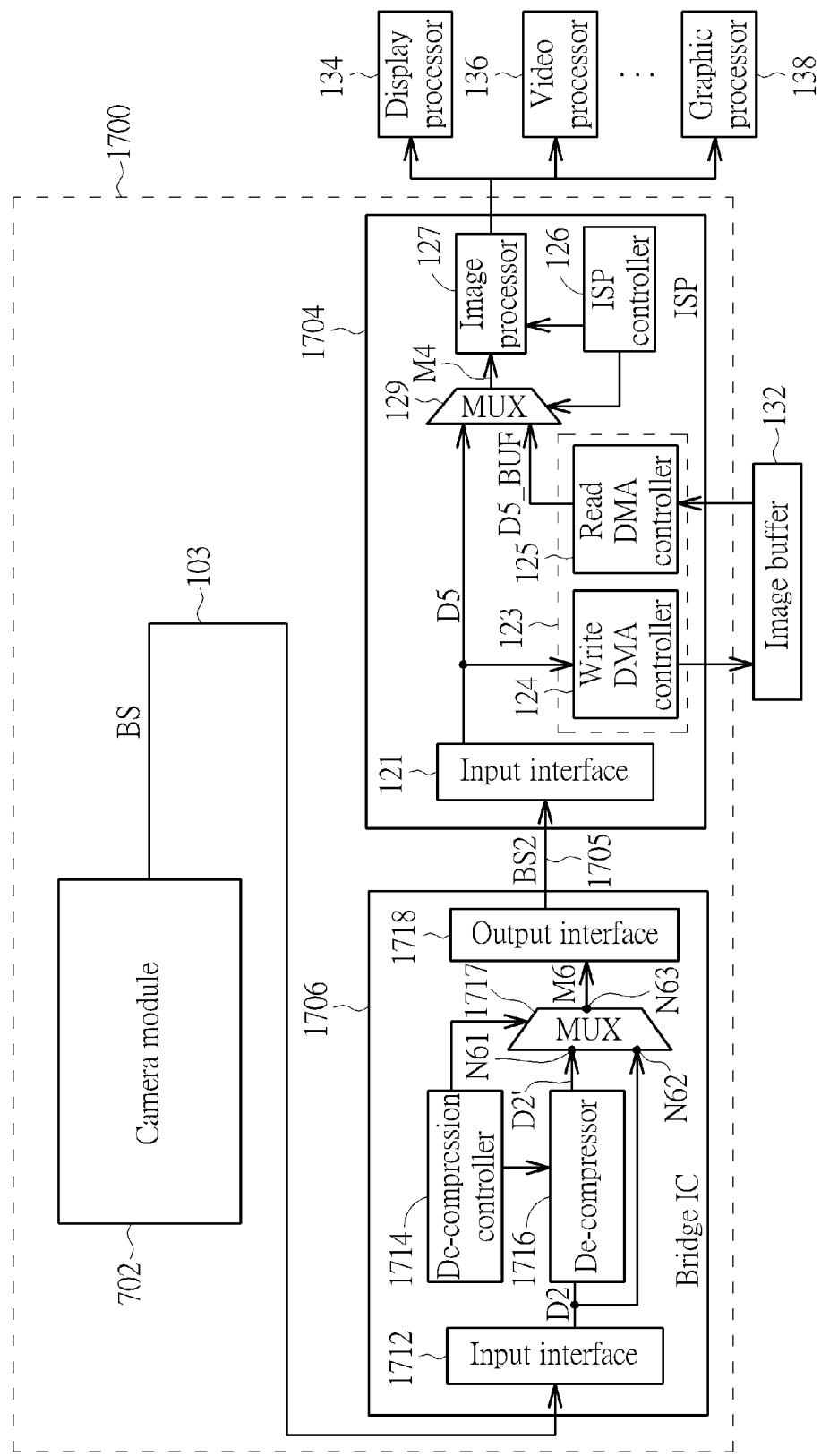
FIG. 17 is a block diagram illustrating a data processing system according to a seventh embodiment of the present invention.

Please refer to FIG. 17, which is a block diagram illustrating a data processing system according to a seventh embodiment of the present invention. The data processing system 1700 includes a plurality of data processing apparatuses such as the aforementioned camera module 702 (which may be implemented using one of the camera modules 102_1-102_5), an ISP 1704, and a bridge IC 1706. The camera module 702, the ISP 1704 and the bridge IC 1706 may be different chips, where the camera module 702 communicates with the bridge IC 1706 via the aforementioned camera interface 103, and the bridge IC 1706 communicates with the ISP 1704 via a camera interface 1705. By way of example, but not limitation, the camera interface 1705 may be a camera serial interface (CSI) standardized by a Mobile Industry Processor Interface (MIPI).

In this embodiment, the bridge IC 1706 includes, but not limited to, an input interface 1712, a de-compression controller 1714, a de-compressor 1716, a multiplexer 1717, and an output interface 1718. The de-compression controller 1714 is arranged to control operations of the bridge IC 1706. For example, the de-compression controller 1714 controls the de-compressor 1716 and the multiplexer 1717. The bridge IC 1706 may operate in a normal/non-decompression mode or a de-compression mode. More specifically, when the camera module 702 operates under a normal/non-compression mode, the bridge IC 1706 is controlled by the de-compression controller 1714 to operate in the normal/non-decompression mode; and when the camera module 702 operates under a compression mode, the bridge IC 1706 is controlled by the de-compression controller 1714 to operate in the de-compression mode.

The input interface 1712 is arranged for receiving the bitstream BS via the camera interface 103, and un-packing the bitstream BS into an input multimedia data D2. More specifically, the input interface 1712 un-packetizes the bitstream BS based on the transmission protocol of the camera interface 103. As shown in FIG. 17, the multiplexer 1717 has a plurality of input ports N61, N62 and an output port N63. The input port N61 is arranged for receiving a de-compressed multimedia data D2' generated from the de-compressor 1716 by applying data de-compression to the input multimedia data D2. The input port N62 is arranged for receiving the input multimedia data D2 generated from the input interface 1712. The output port N63 is arranged for selectively outputting the input multimedia data D2 or the de-compressed multimedia data D2' as a multiplexer output M6. When the de-compression controller 1714 controls the bridge IC 1706 to operate under the normal/non-decompression mode, the de-compressor 1716 is disabled or powered off, and the multiplexer 1717 selects the input multimedia data D2 as the multiplexer output M6 to the following output interface 1718. When the de-compression controller 1714 controls the bridge IC 1706 to operate under the de-compression mode, the de-compressor 1716 is enabled or powered on to receive the input multimedia data D2 and generate the de-compressed multimedia data D2' according to the received input multimedia data D2, and the multiplexer 1717 selects the de-compressed multimedia data D2' as the multiplexer output M6 to the following output interface 1718. The output interface 1718 is arranged for packing the multiplexer output M6 into a bitstream BS2 and outputting the bitstream BS2 via the camera interface 1705. More specifically, the output interface 1718 packetizes the multiplexer output M6 based on the transmission protocol of the camera interface 1705.

The ISP 1704 is arranged for receiving the bitstream BS2 via the camera interface 1705, and processing multimedia data carried by the bitstream BS2. As shown in FIG. 17, the ISP 1704 includes the aforementioned input interface 121, data access circuit 123 having write DMA controller 124 and read DMA controller 125 included therein, ISP controller 126, image processor 127, and multiplexer 129. In this embodiment, the input interface 121 derives the input multimedia data D5 from the bitstream BS2. When the on-the-fly mode is selected for sending the multimedia data to the image processor 127, the multiplexer 129 selects the input multimedia data D5 as the multiplexer output M4. When the off-line mode is selected for sending the multimedia data to the image processor 127, the input multimedia data D5 is stored into the image buffer 132 by the write DMA controller 124, and the multiplexer 129 selects the buffered multimedia data D5_BUF read from the image buffer 132 by the read DMA controller 125 as the multiplexer output M4.

As the bridge IC 1706 is equipped with data de-compression capability, the ISP 1704 is allowed to be implemented using any decompressor-free ISP. The same objective of reducing the transmission data rate over a camera interface (e.g., 103) between a camera module and a ISP for power consumption reduction is achieved.

Figure 18:
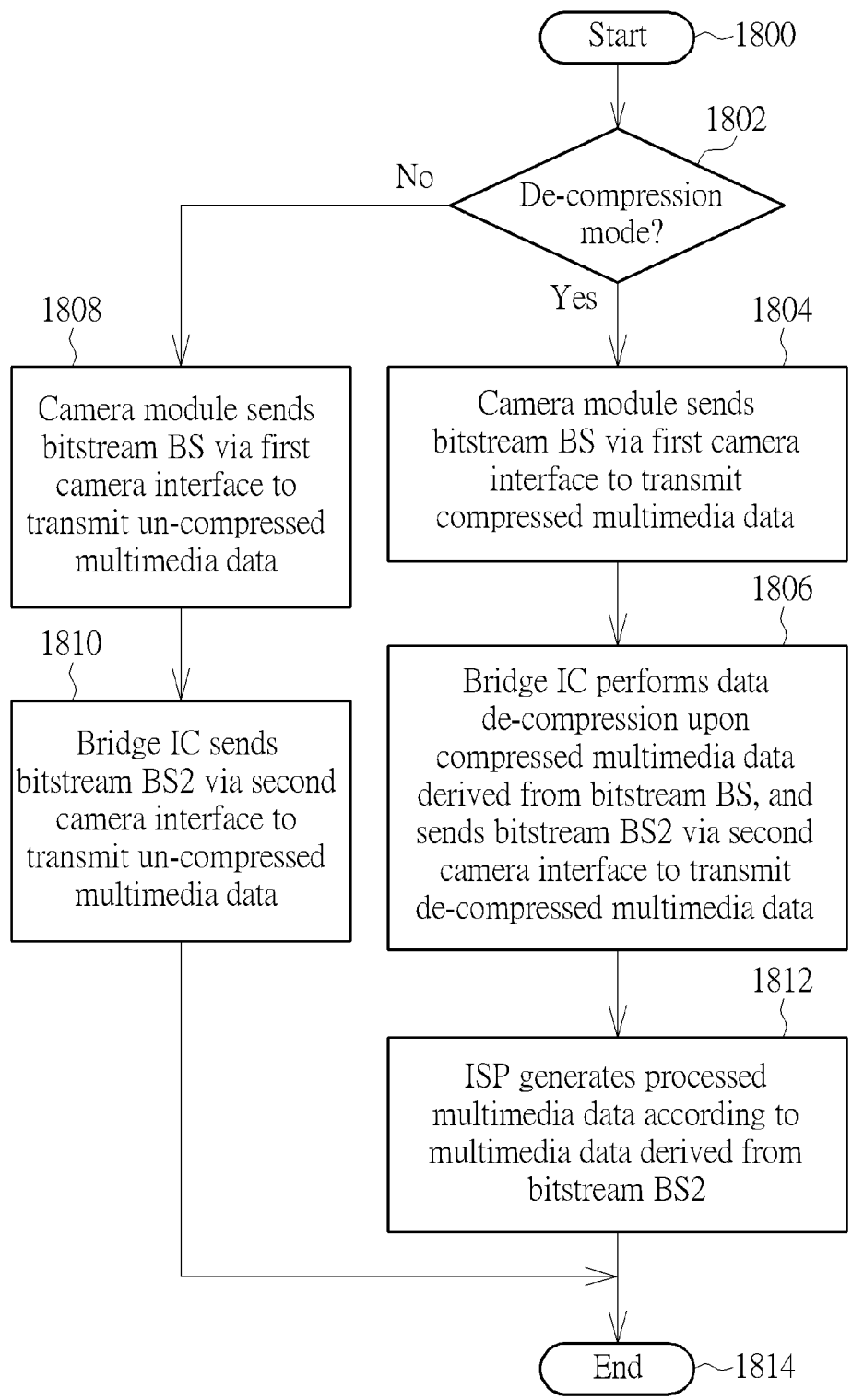
FIG. 18 is a flowchart illustrating a control and data flow of the data processing system shown in FIG. 17.

FIG. 18 is a flowchart illustrating a control and data flow of the data processing system 1700 shown in FIG. 17. Provided that the result is substantially the same, the steps are not required to be executed in the exact order shown in FIG. 18. The exemplary control and data flow may be briefly summarized by following steps.

Step 1800: Start.
Step 1802: Check if the compression mode is enabled. If yes, go to step 1804; otherwise, go to step 1808.
Step 1804: The camera module 702 sends the bitstream BS via the camera interface 103 to transmit compressed multimedia data.
Step 1706: The bridge IC 1706 performs data de-compression upon the compressed multimedia data derived from the bitstream BS, and sends the bitstream BS2 via the camera interface 1705 to transmit the de-compressed multimedia data. Go to step 1812.
Step 1808: The camera module 702 sends the bitstream BS via the camera interface 103 to transmit un-compressed multimedia data.
Step 1810: The bridge IC 1706 sends the bitstream BS2 via the camera interface 1705 to transmit the un-compressed multimedia data.
Step 1812: The ISP 1704 generates a processed multimedia data according to the multimedia data derived from the bitstream BS2.
Step 1814: End.

As a person skilled in the art can readily understand details of each step shown in FIG. 18 after reading above paragraphs directed to the data processing system 1700 shown in FIG. 17, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing apparatus comprising:
an input interface, arranged to receive a bitstream from a camera interface, and un-pack the bitstream into an input multimedia data, wherein the input multimedia data comprises a compressed multimedia data;
a data access circuit, arranged to store a first data derived from the input multimedia data into a multimedia buffer and read a buffered data from the multimedia buffer; and
a de-compressor, arranged to generate a de-compressed multimedia data by de-compressing a second data derived from the input multimedia data;
wherein the camera interface is coupled between the data processing apparatus and another data processing apparatus that are located at different chips, and the camera interface is a chip-to-chip interface that provides direct electrical connections between the different chips;
wherein the data access circuit is arranged to receive the first data from the input interface, and the de-compressor is arranged to receive the second data from the input interface.

2. A method performed by a data processing apparatus comprising:
receiving a bitstream from a camera interface, and un-packing the bitstream into an input multimedia data, wherein the input multimedia data comprises a compressed multimedia data;
storing a first data derived from the input multimedia data into a multimedia buffer, and reading a buffered data from the multimedia buffer; and
de-compressing a second data derived from the input multimedia data to generate a de-compressed multimedia data;
wherein the camera interface is coupled between the data processing apparatus and another data processing apparatus that are located at different chips, and the camera interface is a chip-to-chip interface that provides direct electrical connections between the different chips;
wherein each of the first data and the second data is the input multimedia data.

3. A data processing apparatus comprising:
an input interface, arranged to receive a bitstream from a camera interface, and un-pack the bitstream into an input multimedia data, wherein the input multimedia data comprises a compressed multimedia data;
a data access circuit, arranged to store a first data derived from the input multimedia data into a multimedia buffer and read a buffered data from the multimedia buffer; and
a de-compressor, arranged to generate a de-compressed multimedia data by de-compressing a second data derived from the input multimedia data;
wherein the camera interface is coupled between the data processing apparatus and another data processing apparatus that are located at different chips, and the camera interface is a chip-to-chip interface that provides direct electrical connections between the different chips;
wherein the data processing apparatus further comprises:
a multiplexer, having a first input port, a second input port and an output port;
wherein the input interface is arranged to generate the input multimedia data to the first input port, the de-compressor is arranged to receive the second data from the input interface and output the de-compressed multimedia data to the second input port, and the data access circuit is arranged to receive the first data from the output port.

4. A data processing apparatus comprising:
an input interface, arranged to receive a bitstream from a camera interface, and un-pack the bitstream into an input multimedia data, wherein the input multimedia data comprises a compressed multimedia data;

a data access circuit, arranged to store a first data derived from the input multimedia data into a multimedia buffer and read a buffered data from the multimedia buffer; and a de-compressor, arranged to generate a de-compressed multimedia data by de-compressing a second data derived from the input multimedia data;

wherein the camera interface is coupled between the data processing apparatus and another data processing apparatus that are located at different chips, and the camera interface is a chip-to-chip interface that provides direct electrical connections between the different chips;

wherein the data processing apparatus further comprises:

a multiplexer, having a first input port, a second input port and an output port;

wherein the input interface is arranged to generate the input multimedia data to the first input port, the data access circuit is arranged to receive the first data from the input interface and output the buffered data to the second input port, and the de-compressor is arranged to receive the second data from the output port.

* * * * *